United States Patent [19]
Bardotti

[11] 3,988,714
[45] Oct. 26, 1976

[54] COMPUTER INPUT/OUTPUT APPARATUS FOR PROVIDING NOTIFICATION OF AND DISTINGUISHING AMONG VARIOUS KINDS OF ERRORS

[75] Inventor: Angelo Bardotti, Cesano Boscone (Milan), Italy

[73] Assignee: Honeywell Information Systems Italia, Caluso, Italy

[22] Filed: Sept. 9, 1975

[21] Appl. No.: 611,721

[30] Foreign Application Priority Data
Sept. 13, 1974 Italy.................................. 27258/74

[52] U.S. Cl................. 340/146.1 AG; 235/153 AK; 340/146.1 AB; 340/146.1 C
[51] Int. Cl.².................. H04L 1/10; H04L 1/16; G06F 11/10

[58] Field of Search .. 235/153 A, 153 AC, 153 AK; 340/146.1 AB, 146.1 AG, 146.1 C, 172.5

[56] References Cited
UNITED STATES PATENTS
3,303,476 2/1967 Moyer et al. ..................... 340/172.5
3,909,782 9/1975 Mazier ..................... 340/146.1 AG

*Primary Examiner*—R. Stephen Dildine, Jr.
*Attorney, Agent, or Firm*—L. P. Elbinger

[57] ABSTRACT

Apparatus for providing notification of and distinguishing among various kinds of errors in information transferred between the central processor and the peripheral units of a digital computer system by isolating the elements of such system in which certain kinds of errors can occur.

4 Claims, 16 Drawing Figures

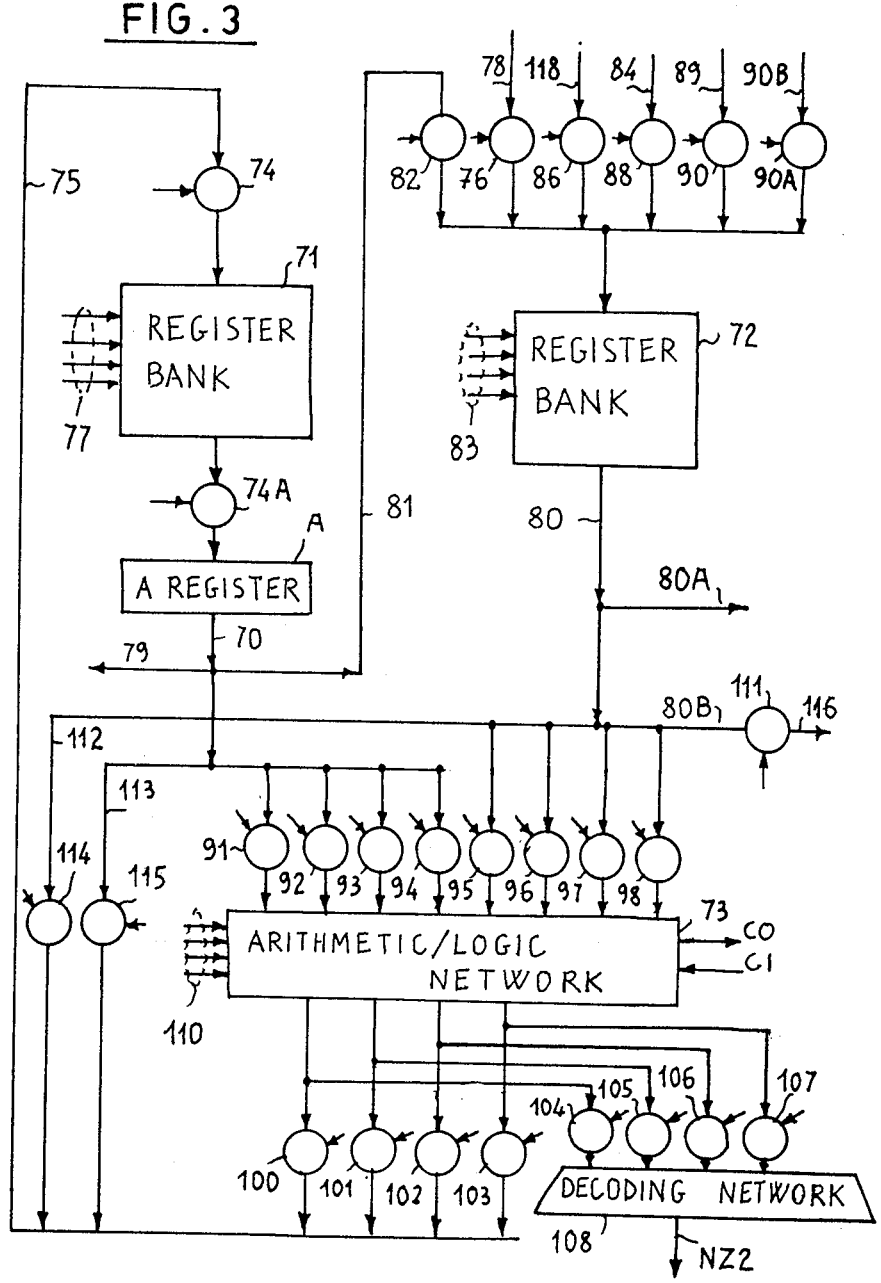

COMPUTER INPUT/OUTPUT APPARATUS FOR PROVIDING NOTIFICATION OF AND DISTINGUISHING AMONG VARIOUS KINDS OF ERRORS

BACKGROUND OF THE INVENTION

This invention relates to input/output apparatus for a digital computer system, and more particularly to interfaces in such a system for coupling peripheral units for communication with the central processor thereof.

The instant invention is an improvement in an interface defined as an "integrated" interface and described in the U.S. Patent Application for COMPUTER INPUT/OUTPUT CONTROL APPARATUS by A. Bardotti and R. Pederzini, Ser. No. 576,523, filed on Apr. 12, 1975, and assigned to the assignee of the present application.

In the design of modern computer systems, the capability for diagnosis and the protection of information have assumed primary roles. In such design, the capability is provided for the system itself to be able to detect and locate with substantial precision the sources of errors, and to be able to determine, to as great an extent as possible, a remedy for such sources, in order to reduce to a minimum the need for external human intervention. However, such capability provides that the system be able to distinguish between the various possible errors which do not adversely affect the execution of subsequent operations and those errors which may cause erroneous or faulty operation in the execution of subsequent tasks or may cause the damaging or irreparable loss of information.

Such modern computer systems include a central processor coupled to a plurality of peripheral units by channels. Each channel comprises a set of lines on which electrical signals representing information are transferred according to appropriate processes. The physical set of such lines and the group of logical, or control, signals transferred thereon is commonly termed an "interface."

In these modern computer systems, the central processor, in addition to having the capability of detecting errors internal thereto, is often employed for executing diagnostic procedures which enable the identification of faults and errors internal to the peripheral units. To properly execute such procedures, it is essential that the interface be operating properly. However, the interface itself is a possible source of errors in the exchange of information between the central processor and the peripheral units, which errors may be due to two basic causes: electrical disturbances or electrical faults.

Independent from the source itself which generates an error, an error may have two effects. Firstly, if the error occurs during the transfer of control information, the execution of the subsequent operations will be irreparably impaired or faulty; consequently, such an error requires the interruption of the operations in process and the initiation of appropriate diagnostic or alerting procedures. Secondly, if the error occurs during the transfer of data, the error impairs only the transferred data and does not, in general, adversely affect the subsequent operations; consequently, such an error allows subsequent operations to be completed if no errors occur during the following transfer of control information.

Accordingly, it is a principal object of the present invention to provide an improved interface for a computer system.

Another object of the present invention is to provide an interface for a computer system which provides signals for and distinguishes between errors occurring in the system.

Another object of the instant invention is to provide an interface for a computer system which determines whether errors detected in the system are attributable to the interface or to an error internal to the central processor or the peripheral units.

Another object of the present invention is to provide an interface for a computer system which distinguishes between errors occurring during a data transfer or during a conrol information transfer.

Another object of the present invention is to provide a computer system in which an interface distinguishes between errors arising in the system and, according to the source of such errors, enables the performance of the most appropriate procedures for diagnosing or recovering from such errors.

SUMMARY OF THE INVENTION

The aforementioned objects are achieved, in accordance with the instant invention, by apparatus which combines the functions of dialogue inversion on the interface and the transmission of an error signal on a suitable interface line. Such functions are initiated by the employment of circuits for detecting parity error and generating corresponding parity error signals, both immediately upstream and downstream of the interface, and by circuits which provide for distinguishing in the information transfer procedures between the transfer of control information and the transfer of data.

BRIEF DESCRIPTION OF THE DRAWING

The invention will be described with reference to the accompanying drawing, wherein:

FIG. 3 is a logical block diagram of the logical unit shown in FIG. 1;

FIG. 4 is a logical block diagram of the main memory shown in FIG. 1;

DESCRIPTION OF THE PREFERRED EMBODIMENT

Figure 1:
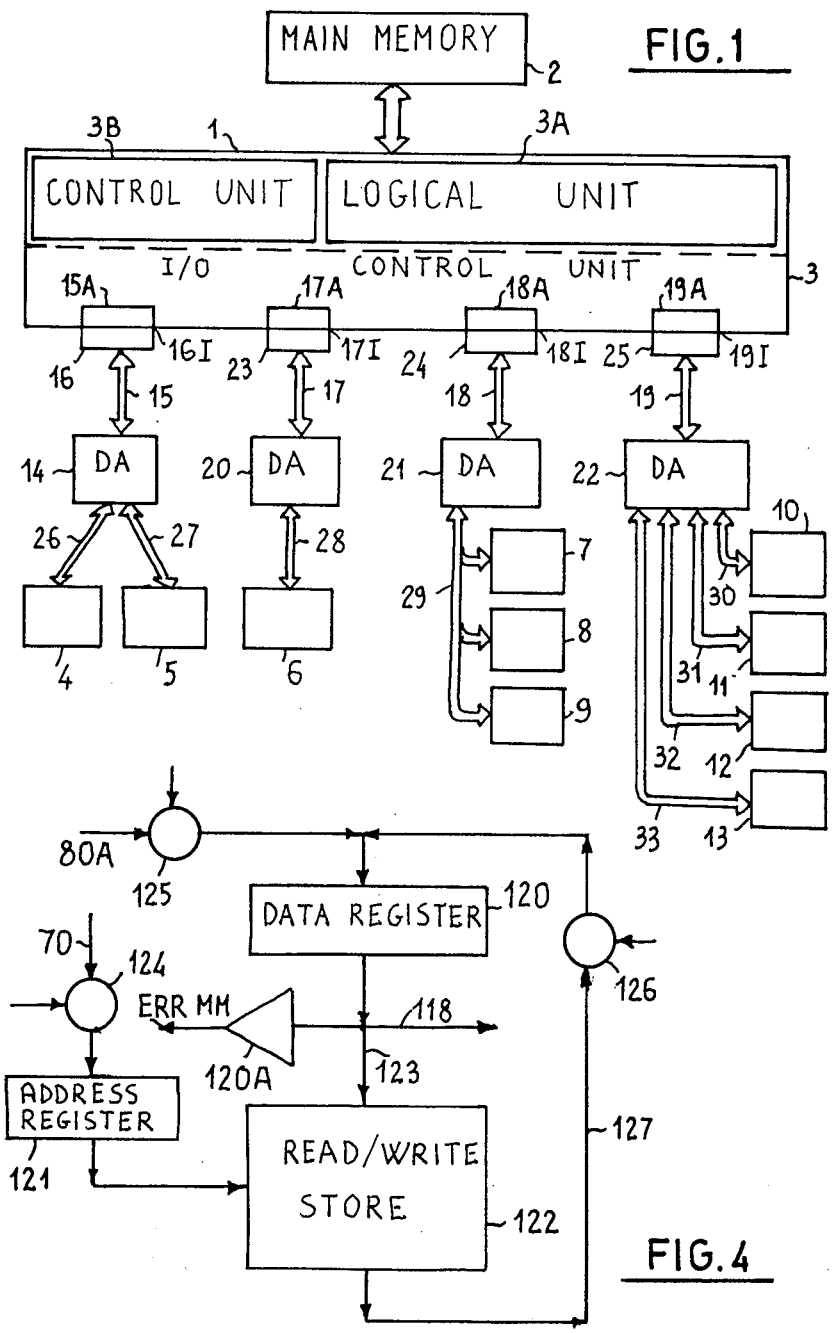
FIG. 1 is a block diagram of a preferred embodiment of a digital computer system implemented according to the present invention.

General Structure of a Computer System with which the Preferred Embodiment Can Be Used The computer system of FIG. 1 comprises a central processor 1, a main memory 2, and a plurality of peripheral units 4–13. Central processor 1 is functionally divided into an input/output (I/O) control unit 3, a logical unit 3A, and a control unit 3B.

Central processor 1 is provided with a plurality of interfaces, which comprise plugs, channels, and subchannels. For example, channels 15, 17, 18, and 19 couple respective device adapters 14, 20, 21, and 22 to central processor 1, through respective interface modules 16, 23, 24, and 25 and respective ports 15A, 17A, 18A, and 19A, providing respective interfaces 16I, 17I, 18I, and 19I.

Device adapter DA 14, by way of example, provides communication between peripheral units 4 and 5 and central processor 1. Device adapter 14 is coupled to central processor 1 through interface 16I, which comprises information exchange channel 15 and a group of interface circuits which comprise interface module 16. Module 16 is connected to port 15A of I/O control unit 3.

Channel 15 is employed as a information exchange channel for both peripheral units 4 and 5, providing communication on a time multiplex basis. Therefore, channel 15 may be considered as comprising two subchannels (or logical channels), each of which provides separate communication, at different times, for a respective one of peripheral units 4 and 5.

Peripheral units 4 and 5 are coupled to device adapter 14 by respective channels 26 and 27. Peripheral unit 6 is coupled to device adapter 20 by a channel 28. Peripheral units 7–9 are coupled to device adapter 21 by a common channel 29. Peripheral units 10–13 are coupled to device adapter 22 by respective channels 30–33.

To transfer data between a peripheral unit and main memory 2 or central processor 1, a communication path for such peripheral unit is established within central processor 1 and within the corresponding device adapter. Within central processor 1, such communication path is provided by I/O control unit 3. I/O control unit 3, as well as the general structure of central processor 1, including logical unit 3A and control unit 3B, and of main memory 2, is more fully described in the U.S. Patent Application for DATA HANDLING SYSTEM HAVING A PLURALITY OF INPUT/OUTPUT CHANNELS AND PHYSICAL RESOURCES DEDICATED TO DISTINCT AND INTERRUPTIBLE SERVICE LEVELS by A. Bardotti, Ser. No. 534,963, filed Dec. 12, 1974, and assigned to the assignee of the present application, and the U.S. Pat. application for DYNAMICALLY VARIABLE PRIORITY ACCESS SYSTEM by A. Bardotti and R. Pederzini, Ser. No. 419,312, filed Nov. 27, 1973, and assigned to the assignee of the present application. Although such referenced applications describe a particular form of computer system and are oriented toward the disclosure of specific inventions, they provide all the information required for an understanding of how a microprogrammed central processor is made and operates. Accordingly, such referenced applications provide information useful for complementing the description of the present application, which description is limited to the specific features of the subject invention. Thus, in such referenced applications and in the description provided herein, the computer system described is provided with a plurality of input/output (I/O) channels.

Figure 2:
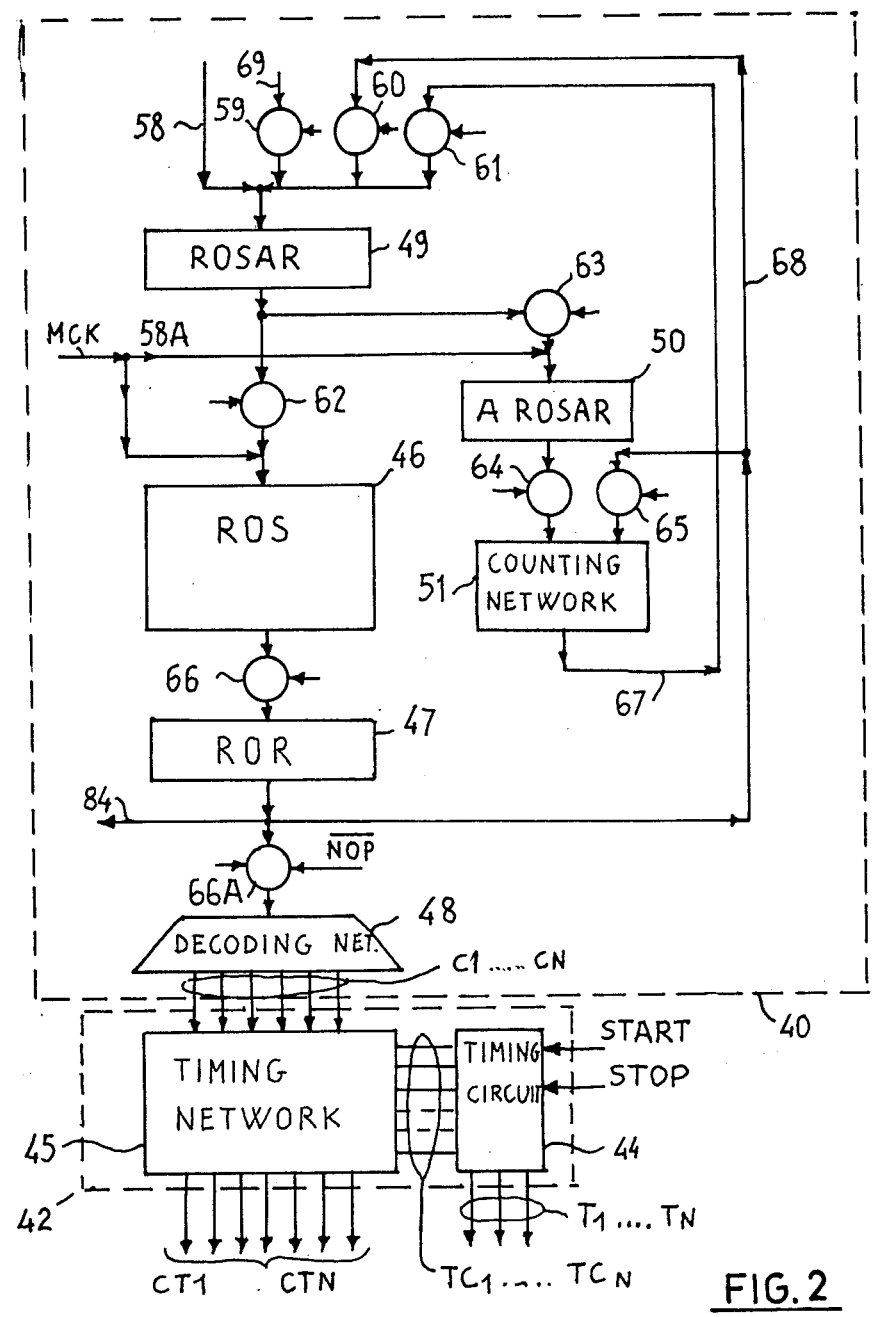
FIG. 2 is a logical block diagram of a preferred form of the control unit of FIG. 1.

Control unit 3B, FIG. 2, basically comprises two portions, a control assembly 40 and a timing unit 42.

Timing unit 42, in turn, comprises a timing circuit 44 and a timing network 45.

Timing circuit 44 generates a cyclic sequence of timing pulses, and may be embodied in different forms. One such form consists of a delay line having a plurality of intermediate taps and receiving input signals from a pulse generator. Such pulse generator may comprise a one-shot (monostable) controlled by an external signal START or controlled by a feedback signal obtained from the delay line itself. In another form, timing circuit 44 comprises an oscillator producing signals having a predetermined base frequency, which base frequency is divided to obtain a sequence of timing pulses. The operation of timing circuit 44 may be halted by a command signal STOP.

A number of the timing pulses generated by timing circuit 44 are transmitted on respective output leads $T_1 \ldots T_N$ to several points in the computer system for controlling the activation of certain gates therein. Other timing pulses of timing circuit 44 are transmitted to timing network 45 on leads $TC_1 \ldots TC_N$.

Timing network 45 receives a plurality of microcommands on respective leads $C_1 \ldots C_N$ from control assembly 40. Timing network 45 responds to the microcommands received thereby, under control of the timing pulses received from timing circuit 44 to deliver a plurality of timed microcommands in respective output leads $CT_1 \ldots CT_N$. Such operation of timing network 45 is provided by means of a logical network comprising a plurality of gates and, as required, flip-flops (bistables). The microcommands delivered by timing network 45 are of appropriate duration and in mutual timed relationship, and are distributed to various points of the computer system, including control unit 3B itself, over a network not shown.

In the illustration of control assembly 40 in FIG. 2 and in other figures of the drawings, a circle represents a logical AND-gate or set of AND-gates. Moreover, in FIG. 2 and elsewhere in the description and drawings, the same identifier or mnemonic is used for a lead or line and the respective signal, pulse, or microcommand carried by such lead or line.

Control assembly 40 comprises a read-only (control) store (ROS) 46, an output register (ROR) 47, a decoding network 48, an address register (ROSAR) 49 holding an address for ROS 46, an auxiliary address register (AROSAR) 50, and a counting network 51.

ROS 46 contains 20-bit microinstructions organized into microprograms, which microprograms control the operation of the computer system and are called by means of program instructions.

A channel 58 transmits to ROSAR register 49 a set of signals representative of a pre-established ROS address, which address may be in binary form. Such address may be obtained during an initialization process by actuation of appropriate keys on the console (not shown) of the computer system and by actuation of a start button, or key, which may start timing circuit 44. Such initialization process thereupon transfers the address pre-established by the console keys over channel 58 and loads it into the ROSAR register.

The next-occurring timing pulse applied to AND-gate set 62 enables such gate set to transfer the preestablished address in the ROSAR register to ROS 46, whereupon the addressed microinstruction is delivered by ROS 46. Such microinstruction is transferred through AND-gate set 66 and loaded into ROR register 47. This microinstruction is then transferred over the output leads of the ROR register and through AND-gate set 66A, then enabled by the $\overline{\text{NOP}}$ signal (to be described hereinafter), to decoding network 48, wherein such microinstruction is decoded. The decoded signals corresponding to such microinstruction are transferred over the output leads of decoding network 48 to timing network 45, which, in turn, converts such decoded signals to timed microcommands.

The ROS address held in the ROSAR register may be updated, or changed, in several ways. Thus, the current address in the ROSAR register may be incremented by 1, by transfer of such address through AND-gate set 63 and into the AROSAR register, and then through AND-gate set 64 to counting network 51, which increments the received address by the value 1. Such incremented address may then be loaded into the ROSAR register by transfer over a channel 67 and through AND-gate set 61. However, the address held in the ROSAR register also may be incremented by any appropriate quantity K, which is obtained from the microinstruction held in the ROR register and applied to counting network 51 over a channel 68 and through AND-gate set 65.

A new address may be loaded into the ROSAR register from the microinstruction held in the ROR register. Thus, a certain number of the bits held in the ROR register may be transferred over channel 68 and through AND-gate set 60 into the ROSAR register. A new address also may be loaded into the ROSAR register from an A register over a channel 69 and through AND-gate set 59. The A register, described hereinafter, is one of the various working registers within the central processor of the computer system. Because the A register can receive the contents of other registers of the central processor, the peripheral units or other external units, or main memory 2, this last described path for loading addresses into the ROSAR register enables any data source within the computer system or any data source coupled to the computer system to address ROS 46.

In addition to the channels which load addresses into the ROSAR register, a channel 58A may be employed for directly supplying an address to ROS 46 and for loading an address into the AROSAR register. When certain error-detecting networks, some of which will be described hereinafter, recognize the occurrence of an error or fault, an MCK (Machine Check) signal, which denotes the occurrence of such error or fault, may be generated. A NOP signal will be generated at the same time, and the corresponding logical negation, or inversion, signal, the $\overline{\text{NOP}}$ signal, ceases thereby disabling AND-gate set 66A. (A signal in its high level state is considered to represent a binary 1, and such high level state is considered to be the 1-state of such signal. A signal is said to occur, or to be present, when it is in such 1-state. Conversely, a signal in its low-level state is considered to represent a binary 0 and to be in the 0-state. A signal in the 0-state is considered not to be present, or to be occurring.) This disabling of AND-gate set 66A prevents generation by timing network 45 of the timed microcommands which correspond to the contents of the ROR register.

The MCK signal on channel 58A represents a fixed ROS address. Such fixed address may point to a particular ROS microprogram having a diagnostic function for identifying the nature of the error and, in certain instances, the sources thereof. The first part of such diagnostic microprogram checks to determine whether the ROS is operating correctly. If the ROS is verified as operating correctly, such microprogram terminates the NOP signal, thereby enabling the microprogram to proceed to identify errors or faults external to the ROS. Such ensuing procedure will be described further hereinafter.

Control assembly 40 operates with parallel transfer of information according to conventional techniques. The bit length of the ROS addresses is related to the number of ROS positions which must be addressed, and is independent of the bit length of the microinstructions supplied by ROS 46. For example, if an ROS having 64,000 locations is employed, the ROS addresses must comprise 16 bits, so that $2^{16}$, or 64,000, different addresses can be formed. Accordingly, the channels employed for transferring ROS addresses will consist of 16 lines, and the ROSAR register and AROSAR register each will comprise 16 storage cells for holding 16 bits. On the other hand, the ROR register has the same number of cells as the number of bits in a microinstruction; for example, 20 bits. When an ROS address is obtained from a microinstruction held in the ROR register, only 16 of the 20 bits therein are used as the ROS address and, therefore, are transferred over channel 68.

Logical unit 3A, FIG. 3, basically comprises register banks 71 and 72, an A register which is a working register, and an arithmetic/logic network 73.

Register bank 71 comprises 16 registers, each adapted to hold 16 bits. The registers of register bank 71 are addressed by a microcommand code received on input leads 77. Information transmitted over a channel 75 is controllably passed by AND-gate set 74 for entry into the addressed register of register bank 71. The information content of the addressed register of register bank 71 may be transferred to the A register through AND-gate set 74A.

The contents of the A register are applied to a distributor channel 70, and may be passed from such channel through selectively controlled AND-gate sets 91–94 to arithmetic/logic network 73. The contents of the A register also may be transferred over a channel 81 and through AND-gate set 82 to register bank 72.

Register bank 72 comprises 16 registers, each adapted to hold 16 bits. The registers of register bank 72 are addressed by a microcommand code received on input leads 83. The information content of the addressed register of register bank 72 is continuously applied to a distributor channel 80, so that register bank 72, with respect to channel 80, functions as an apparent single B register. The contents of such apparent B register may be passed from channel 80 through selectively controlled AND-gate sets 95–98 to arithmetic/logic network 73.

The addressed register of register bank 72 may be loaded with information coming from several different sources. As described previously, the contents of register A may be transferred over channel 81 and through AND-gate set 82 to register bank 72. A channel 78 is coupled to receive information delivered by a peripheral unit, such information being controllably passed by AND-gate set 76 to register bank 72. A channel 118, FIG. 4, is coupled to receive information delivered by main memory 2, such information being controllably passed by AND-gate set 86 to register bank 72. A channel 84, FIG. 2, is coupled to receive microinstructions delivered by ROS 46, such microinstructions being controllably passed by AND-gate set 88 to register bank 72. A channel 89 is coupled to receive information which may be supplied through manual actuation of keys on the console of the computer system, such information being controllably passed by AND-gate set 90 to register bank 72. A channel 90B is coupled to receive information representative of the status of the I/O channels and provided by channel registers, not shown, such information being controllably passed by AND-gate set 90A to register bank 72.

Register banks 71 and 72 can be addressed simultaneously so as to address in each such bank a single register at a given time.

Register bank 72 and the A register provide simultaneous input date for arithmetic/logic network 73 to process. Network 73 is coupled to register bank 72 and the A register through respective distributor channels 80 and 70 and certain groups of AND-gates. Such AND-gates are arranged in groups in accordance with: (1) the format of the data to be processed (i.e.; binary, decimal packed, or decimal unpacked), (2) the date processing operation to be executed, and (3) the degree of parallel processing to be provided by the registers and network 73.

In the particular arrangement illustrated in FIG. 3, the registers and network 73 each process 16 bits in parallel. Such a degree of parallel processing permits operations on two "bytes" of data at a time, on a single byte, or on a zone of a byte. To this end, the AND-gates which couple the input leads of network 73 to distributor channels 70 and 80 are divided into sets 91–98. For 16-bit data words, AND-gate sets 91 and 95 control transfer of bits 0–3 of the respective words, sets 92 and 96 control transfer of bits 4–7 of the respective words, sets 93 and 97 control transfer of bits 8–11 of the respective words, and sets 94 and 98 control transfer of bits 12–15 of the respective words.

The output leads of arithmetic/logic network 73 are coupled to collector channel 75 through AND-gate sets 100–103. Such output leads are also coupled through AND-gate sets 104–107 to a decoding network 108. Decoding network 108 responds to particular configurations of bits delivered on the output leads of network 73 (e.g.; all zeros, or all zeros with respect to the groups of bits corresponding to the enabled AND-gate sets) to generate the signal NZ2. The appearance of signal NZ2 verifies the occurence of the particular output configuration of bits from network 73 and accordingly, the occurrence of a particular condition represented by such configuration.

Network 73 may be embodied by conventional logic circuits using integrated circuit technology. Detailed descriptions of various types of such networks are widely found in current publications describing computer design. For example, such information may be found in the textbook, Digital Computer and Control Engineering by Robert S. Ledley, McGraw-Hill Book Company, Inc., 1960, particularly Part 4.

Arithmetic/logic network 73 performs the following principal operations:

1. arithmetic operations of addition and subtraction, both binary and decimal, and of multiplication and division;
2. logic operations, including the logical AND, OR, and EXCLUSIVE-OR, and comparison and shift operations; and
3. incrementing operations (counting up and down).

The particular operation to be performed by network 73 is specified by a set of microcommands supplied by control unit 3B on input leads 110.

The data present on collector channel 75 following an operation performed by network 73 may be transferred to and loaded into an appropriate register of register bank 71 and, subsequently, transferred to the A register. Such contents of the A register can then be transferred to and held in a register of register bank 72 for ultimate storage in main memory 2 by transfer over a channel 80A, or delivery to a peripheral unit by transfer over a channel 80B and through AND-gate set 111. Channel 80A is coupled to main memory 2, FIG. 4, and channel 116, which receives the output signals delivered by AND-gate set 111, provides an output path for transferring data through I/O control unit 3 to the peripheral units.

Data on distributor channel 70 may be transferred over a "by-pass" channel 113 and through AND-gate set 115 to collector channel 75. Data on distributor channel 80 may be transferred over a by-pass channel 112 and through AND-gate set 114 to collector channel 75.

Finally, logical unit 3A comprises certan flip-flops, not shown, to store a representation of particular conditions arising during the operation of network 73, such as the conditions of carry in and carry out and the results of certain testing operations performed on data by particular decoding networks.

Main memory 2, FIG. 4, basically comprises a read/write store 122, an address register 121, a DATA register 120, and an appropriate number of communication channels. Read/write store 122 holds 18-bit words.

Channel 70 is coupled to receive information representing addresses from the A register, FIG. 3, such addresses being controllably passed by AND-gate set 124 to address register 121. The length of register 121 corresponds to the maximum desired capacity of store 122. For example, an address register holding 16 bits enables the addressing of a store having approximately 64,000 locations or storage cells.

Information to be entered into store 122 is first transferred from register bank 72, FIG. 3, over channel 80A and through AND-gate set 125 to DATA register 120. The contents of DATA register 120 are then entered into the addressed cell of store 122 over a channel 123.

The contents of the addressed cell of store 122 are transferred over a channel 127 and through AND-gate set 126 to DATA register 120. The contents retrieved from read/write store 122 are then transferred from DATA register 120 over channel 118 to register bank 72, FIG. 3.

The information contents of DATA register 120 are subjected to a parity check by a parity control network 120A. If network 120A detects an error in such information, it generates an error signal ERR MM, which signal is employed for initiating appropriate diagnostic and error notification procedures.

Figure 5:
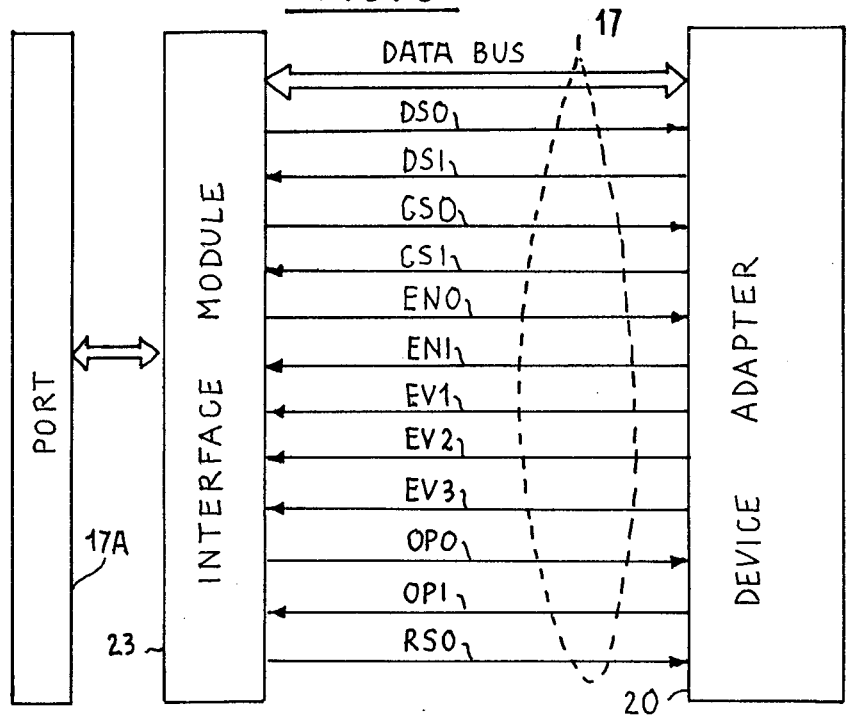
FIG. 5 is a schematic diagram of an integrated interface used in the system of FIG. 1.

INTERFACE:

The interface of FIG. 5, according to the invention, comprises channel 17, port 17A, and interface module 23. Module 23 comprises circuits dedicated to the transfer of information on channel 17 and to controlling the timing of such transfer. Channel 17 comprises a plurality of data and control lines, as follows:

DATA BUS

The Data Bus comprises a group of nine bidirectional lines, of which eight lines carry signals representing binary digital (bit) information and one line carries a signal representing an odd parity bit. Thus, the Data Bus provides a one-byte path through the interface. The information signals transferred over the Data Bus primarily represent the following:

Data-out information (write data and I/O commands);

Data-in information (read data and peripheral subsystem status);

Control-out information (I/O instructions to the device adapter and destination of data transmitted from the I/O control unit (IOC) to the device adapter);

Control-in information (interface errors reported from the device adapter).

The meaning to be attributed to the byte present of the Data Bus is defined by timing signals present concurrently on the interface, as follows (the same identifier or mnemonic is used for a signal and the line which carries the signal):

DATA STROBE IN (DSI)

The DSI line performs two functions: (1) transmits a timing signal from device adapter 20 to interface module 23 which characterizes the byte then present on the Data Bus as data, when data is being transferred from the associated peripheral unit to central processor 1; and (2) transmits a signal representing a response to a timing signal DSO received from interface module 23 during the transfer of data from central processor 1 to the peripheral unit.

DATA STROBE OUT (DSO)

The DSO line performs two functions: (1) transmits a timing signal from interface module 23 to device adapter 20 which characterizes the byte then present on the Data Bus as data, when data is being transferred from central processor 1 to the associated peripheral unit; and (2) transmits a signal representing a response to a timing signal DSI received from device adapter 20 during the transfer of data from the peripheral unit to central processor 1.

CONTROL STROBE IN (CSI)

The CSI line performs two functions: (1) transmits a timing signal from device adapter 20 to interface module 23 which characterizes the byte then present on the Data Bus as control information, when control or service information is being transferred from device adapter 20 to central processor 1; and (2) transmits a signal representing a response to a timing signal CSO received from interface module 23 during the transfer of control information from central processor 1 to the associated peripheral unit.

CONTROL STROBE OUT (CSO)

The CSO line performs two functions: (1) transmits a timing signal from interface module 23 to device adapter 20 which characterizes the byte then present on the Data Bus as control information, when control information is being transferred from central processor 1 to device adapter 20; and (2) transmits a signal representing a response to a timing signal CSI received from device adapter 20 during the transfer of control information from device adapter 20 to central processor 1.

OPERATIONAL OUT (OPO)

The OPO line provides notification from interface module 23 to device adapter 20 of the status of interface module 23 and central processor 1. When the signal OPO represents a binary 1 (is in the 1-state), it denotes that central processor 1 and interface module 23 are operational and in condition to communicate with device adapter 20, whereas when the signal OPO represents a binary 0 (is in the 0-state), it denotes that central processor 1 and interface module 23 either are not energized by the power supply, or for some other reason are not operational.

OPERATIONAL IN (OPI)

The OPI line provides notification from device adapter 20 to interface module 23 of the status of device adapter 20. When the signal OPI is in the 1-state, it denotes that device adapter 20 is operational and in condition to communicate with central processor 1, whereas when the signal OPI is in the 0-state, it denotes that device adapter 20 either is not energized by the power supply, or for some other reason is not operational.

RESET OUT (RSO)

The RSO line transmits a signal, in pulse form, from central processor 1 to device adapter 20 to reset the device adapter to its initial state. When not in such pulse form, the signal RSO is in the 0-state.

ENABLE IN (ENI)

The ENI line is a control line, transmitting a control signal from device adapter 20 to interface module 23 to perform two functions: (1) when the signal ENI is in the 1-state, it denotes that the direction of information (data or control information) being transferred on the Data Bus is from device adapter 20 to central processor 1; and (2) when it transfers from the 0-state to the 1-state, it initiates acquisition of control of the integrated interface in order to put the interface at the service of device adapter 20 so as to provide for the transfer of information to central processor 1.

When device adapter 20 is in its initial, or reset, state, the signal ENI must be in the 0-state. Except for the signal RSO, described above, central processor 1 cannot transfer the signal ENI to the 0-state, the signal ENI being so transferable only under sole control of device adapter 20, at such time as the device adapter relinquishes control of the integrated interface to central processor 1.

ENABLE OUT (ENO)

The ENO line is a control line, transmitting a control signal from interface module 23 to device adapter 20 to denote that the direction of information (data or control information) being transferred on the Data Bus is from interface module 23 to device adapter 20.

When interface module 23 detects the transfer of the signal ENI to its 0-state, it transfers the signal ENO to the 1-state. The concurrence of the signal ENO in the 1-state and the signal ENI in the 0-state denotes that the integrated interface is either ready for or is then transferring information from interface module 23 to device adapter 20. Conversely, when interface module 23 detects the transfer of the signal ENI to the 1-state, it transfers the signal ENO to the 0-state. Thus, the concurrence of the signal ENO in the 0-state and the signal ENI in the 1-state denotes that the integrated interface is either ready for or is then transferring information from device adapter 20 to interface module 23.

Accordingly, the main purpose of the signals ENO and ENI is to provide a representation of the direction of flow of data or control information on the Data Bus. An auxiliary function of these two signals is to denote that a transfer of data on the interface occurred properly.

As will be described hereinafter, all dialogue sequences start with a control-out information transfer, followed by a data transfer. Accordingly, the signal ENO must be in its 1-state at the beginning of each dialogue sequence. The data transfer which then follows is initiated by either interface module 23 or device adapter 20, as specified by the control-out information.

The data-out information transfer initiated by interface module 23 is performed with the signal ENO in the 1-state. Such data-out transfer can be aborted instantaneously by device adapter 20 and replaced by a control-in information transfer when an error (parity or illegal code) is detected by device adapter 20 during the control-out information transfer. The data-out information transfer is always followed by a double data path reversal to denote the proper termination of the dialogue sequence. If an error is detected by device adapter 20 in the data transfer sequence, it may initiate a control-in information transfer instead of such double data path reversal. At the termination of each dialogue sequence, the signal ENI must be transferred to the 0-state by device adapter 20, which transfer, in turn, causes the transfer of the signal ENO to the 1-state.

The data-in information transfer initiated by device adapter 20, after the control-out information transfer provides the device adapter with the appropriate command, starts by transferring the signal ENI to the 1-state, which transfer, in turn, causes the transfer of the signal ENO to the 0-state. At the termination of the data-in information transfer, device adapter 20 transfers the signal ENI to the 0-state, which transfer, in turn, causes the transfer of the signal ENO to the 1-state.

When the system is initialized, the signal ENO is placed in the 1-state.

EVENT NO. 1 (EV1)

The Event No. 1 line provides notification from device adapter 20 to interface module 23 that a first group of asynchronous events is to occur at device adapter 20, such notification being provided when the signal EV1 is in the 1-state. The signal EV1 is transferred to the 0-state by device adapter 20 when interface module 23 transmits the appropriate response signal.

When device adapter 20 is initialized, the signal EV1 is placed in the 0-state.

The usual function of the signal EV1 is to denote that device adapter 20 is ready to transfer data. Signal EV1 is interpreted by interface module 23 as representing a request for a character transfer. Signal EV1 either may be in the 1-state for the entire time required to transfer several items of data or characters, or may be transferred to the 1-state and back to the 0-state for each character transfer, according to the particular type of peripheral unit involved in the data transfer.

The signal EV1 indirectly causes the generation of a signal in interface module 23, which latter signal will be designated herein as the signal INTB (such notation being consistent with that employed in the above-identified patent application SN576523). The signal INTB is interpreted by central processor 1 as an interrupt request (for a character transfer), and a preestablished priority level is allocated to such request.

EVENT NO. 2 (EV2)

The EV2 line provides notification from device adapter 20 to interface module 23 that a second group of asynchronous events is to occur at device adapter 20, such notification being provided when the signal EV2 is in the 1-state. The signal EV2 is transferred to the 0-state by device adapter 20 when interface module 23 transmits the appropriate response signal.

When device adapter 20 is initialized, the signal EV2 is placed in the 0-state. The various events which cause the transfer of the signal EV2 to the 1-state are:

Asynchronous events such as device state changes and changes introduced from the operator panel;

Events which are not time-dependent; A device adapter or peripheral unit incident; and The termination of an order or an off-line phase.

Interface module 23 responds to signal EV2 in the 1-state to initiate a dialogue sequence. Accordingly, the signal EV2 is interpreted by central processor 1 as an interrupt request of a different type than that represented by signal EV1, and an appropriate priority level is allocated to such request.

EVENT NO. 3 (EV3)

The EV3 line provides notification from device adapter 20 to interface module 23 that a parity error has been detected in control information. Accordingly, the signal EV3 represents the integrity of the interface during a dialogue sequence. The signal EV3 is transferred to the 1-state by device adapter 20, and signal CSI is concurrently transferred to the 1-state. The signal EV3 is transferred to the 0-state by device adapter 20 when the signal CSO transfers to the 0-state.

When device adapter 20 is initialized, the signal EV3 is placed in the 0-state.

The signal EV3 is representative only of the detection of parity errors, and if any other type of error is detected, such as an illegal code in information being transferred, the signal EV3 is not employed for providing notification.

The combination of the employment of the signal EV3 and the control sequence initiated by such signal is a principal feature of the instant invention, and will be described in greater detail hereinafter.

INTEGRATED INTERFACE DIALOGUE SEQUENCES

Four basic dialogue sequences occur in the integrated interface. These are identified as:

Write Without Error (for information transfer from the central processor);

Write With Error In Data (for information transfer from the central processor);

Read Without Error (for information transfer to the central processor);

Read or Write With Error In Control Information.

As will be shown hereinafter all such dialogue sequences, whether initiated by central processor 1 or by a peripheral unit through an interrupt request made by means of a signal EV1 or signal EV2, are always characterized by the preliminary transfer to device adapter 20 of control information or a control character. If no error is found in such control character, central processor 1 next transmits or receives an information byte (data, command or peripheral unit status).

The control character comprises nine bits. One bit of the control character represents the direction of transfer (read or write in the sense described above). A seven-bit group of the control character usually represents, in coded form, the address of a register within the peripheral subsystem; for example, a register for storing commands or a status register from which information pertaining to the status of the peripheral subsystem may be retrieved. (A peripheral subsystem comprises a device adapter and the peripheral units coupled to such device adapter.) The ninth bit of the control character is employed as a parity control bit to ensure the integrity of the information transferred.

Some registers which are used exclusively to store data to be retrieved or to be written into (for example, a write data register and a read data register) are suitably addressed by a six-bit code. In such instance, as will be described hereinafter, the remaining seventh bit of the seven-bit group is employed to provide additional information of a different type.

A communication between central processor 1 and device adapter 20 comprises a plurality of particular kinds of dialogue sequences, which will be described in more detail hereinafter, but may be considered as comprising three phases:

1st Phase - Initiating the communication.

In this phase, dialogue sequences are initiated directly by the central processor, and not as a consequence of an interrupt request received from a device adapter and represented by signal EV1 or signal EV2. In the dialogue sequences of this phase, control processor 1 transmits to the device adapter information pertaining to the particular peripheral unit to be selected, commands and other control information.

2nd Phase - Data Transfer Phase.

Following the first phase, and when required, this phase may occur. In this phase the dialogue sequences are initiated by a signal EV1 for both the write sequences and the read sequences. The signal EV1 may be transferred to the 1-state and back to the 0-state by the device adapter for each character transfer (for each dialogue sequence) or may be maintained in the 1-state for the entire time required by this data transfer phase.

3rd Phase - Completing the Communication.

This phase is initiated by the device adapter following termination of the second phase (or termination of the first phase) by transfer of the signal EV2 to the 1-state. This phase serves to notify central processor 1 of the completion of execution of the previously received commands and of the peripheral unit status.

Because the dialogue sequences do not differ, whether initiated by central processor 1 or by interrupt requests, signals EV1 and EV2 are not described or illustrated in the following description of these dialogue sequences, even though such signals may be in the 1-state.

Write Without Error

Figure 6:
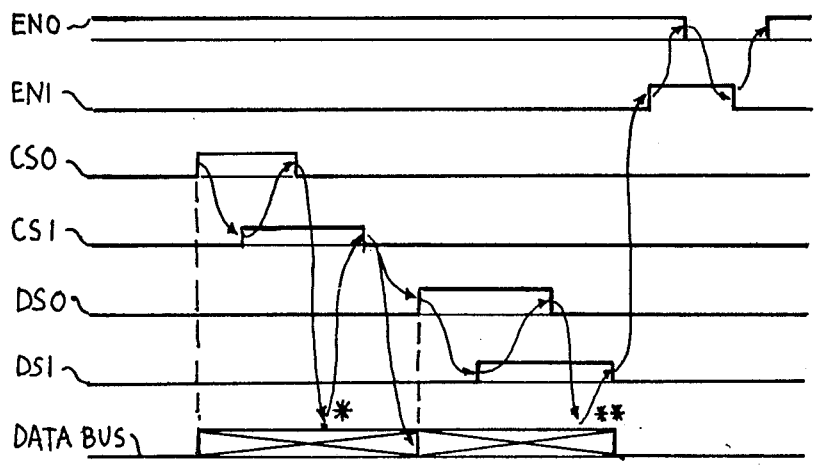
FIGS. 6–9 are timing diagrams of various types of dialogue sequences for the integrated interface.

In the timing diagram of FIG. 6, which illustrates the Write Without Error dialogue sequence, the temporal relationship between the signals illustrated therein is represented by chained arrows. Each signal transition is illustrated only as of the time at which it occurs at its source, and the time at which such transition is received at the opposite end of the interface line on which it is transmitted occurs after a delay that depends on the length of such line.

If the signal ENO is in the 1-state, interface module 23, in this dialogue sequence, transfers the signal CSO to the 1-state and simultaneously applies control information signals to the Data Bus. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. Such acceptance is designated by the single asterisk in FIG. 6.

Device adapter 20 now suspends the dialogue sequence in order to check the parity and validity of the control information byte received, by delaying the transfer of the signal CSI to the 0-state. When the signal CSI is finally transferred to the 0-state, such transition is notification to interface module 23 that it can remove the control information signals from the Data Bus and apply other information signals thereto.

The control information so accepted by device adapter 20 is now stored by the device adapter, because such control information represents the destination or the source of the data that next is to be transferred over the interface. Such control information is then interpreted by device adapter 20 as an instruction and is decoded by the device adapter to determine the next step to occur in the dialogue sequence. In the Write Without Error dialogue sequence, this next step will be a data-out information transfer to be initiated by interface module 23.

Accordingly, interface module 23 next transfers the signal DSO to the 1-state and simultaneously applies data signals to the Data Bus. When device adapter 20 detects this transition in the state of the signal DSO, and if it is ready to receive such data, the device adapter transfers the signal DSI to the 1-state. Interface module 23 thereupon detects this transition in the state of the signal DSI and transfers the signal DSO to the 0-state. When device adapter 20 detects this next transition in the signal DSO, to the 0-state, it then accepts the data signal from the Data Bus. Such acceptance is designated by a double asterisk in FIG. 6.

Device adapter 20 can suspend the dialogue sequence in order to check the parity of the data received, by delaying the transfer of the signal DSI to the 0-state. When the signal DSI is finally transferred to the 0-state, such transition is notification to interface module 23 that it can alter the information signals being applied to the Data Bus.

Device adapter 20 next transfers the signal ENI to the 1-state which, in turn, causes interface module 23 to transfer the signal ENO to the 0-state. When device adapter 20 detects this transition in the state of the signal ENO, it transfers the signal ENI to the 0-state. Interface module 23 responds to such transfer of the signal ENI, to the 0-state, to transfer the signal ENO to the 1-state. The integrated interface is thereupon ready to initiate another dialogue sequence.

Write With Error In Data

Figure 7:
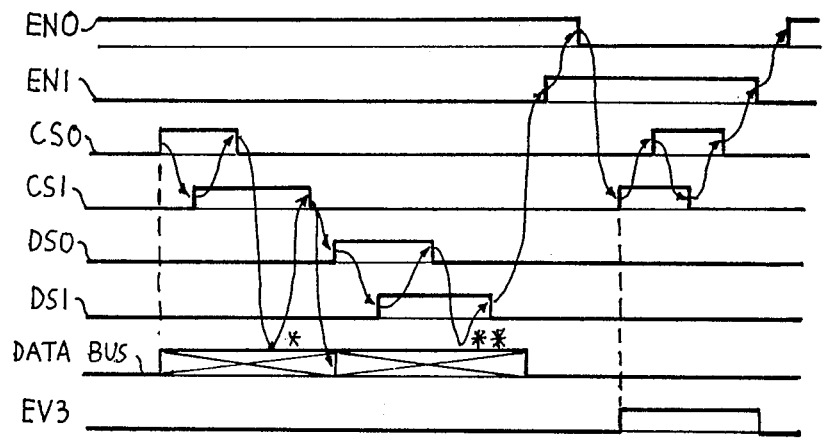

This dialogue sequence is initiated when interface module 23 transfers the signal CSO to the 1-state, FIG. 7, and simultaneously applies control information signals to the Data Bus, which initiation takes place only after the interface module has verified that the signal ENO is in the 1-state and the signal ENI is in the 1-state. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. Such acceptance is designated by the single asterisk in FIG. 7.

Device adapter 20 now suspends the dialogue sequence in order to check the parity and validity of the control information byte received, by delaying the transfer of the signal CSI to the 0-state. When the signal CSI is finally transferred to the 0-state, such transition is notification to interface module 23 that it can remove the control information signals from the Data Bus and apply other information signals thereto.

The control information so accepted by device adapter 20 is now stored by the device adapter, because such control information represents the destination or the source of the data that next is to be transferred over the interface. Such control information is then interpreted by device adapter 20 as an instruction and is decoded by the device adapter to determine the next step to occur in the dialogue sequence. In the Write With Error In Data dialogue sequence, this next step will be a data-out information transfer to be initiated by interface module 23.

Accordingly, interface module 23 next transfers the signal DSO to the 1-state and simultaneously applies data signals to the Data Bus. When device adapter 20 detects this transition in the state of the signal DSO, and if it is ready to receive such data, the device adapter transfers the signal DSI to the 1-state. Interface module 23 thereupon detects this transition in the state of the signal DSI and transfers the signal DSO to the 0-state. When device adapter 20 detects this next transition in the signal DSO to the 0-state, it then accepts the data signals from the Data Bus. Such acceptance is designated by a double asterisk in FIG. 7.

Device adapter 20 can suspend the dialogue sequence in order to check the parity of the data received, by delaying the transfer of the signal DSI to the 0-state. When the signal DSI is finally transferred to the 0-state, such transition is notification to interface module 23 that it can alter the information signals being applied to the Data Bus.

In the instant dialogue sequence, a parity error has been detected in the data received. Therefore, device adapter 20 first transfers the signal ENI to the 1-state, which, in turn, causes interface module 23 to transfer the signal ENO to the 0-state. When device adapter 20 detects this transition in the state of the signal ENO, it transfers the signal CSI to the 1-state. When interface module 23 detects this transition in the state of the signal CSI, it transfers the signal CSO to the 1-state. The device adapter thereupon detects this transition in the signal CSO and transfers the signal CSI to the 0-state which, in turn, causes the interface module to transfer the signal CSO to the 0-state. Such signal exchange with the signal ENO in the 0-state and the signal ENI in the 1-state provides notification to interface module 23 that a parity error has been detected by device adapter 20.

After the device adapter detects this latest transition of the signal CSO to the 0-state, it transfers the signal ENI to the 0-state which, in turn, causes interface module 23 to transfer the signal ENO to the 1-state, thereby permitting the integrated interface to initiate a new dialogue sequence.

The error notification signalling provided by the device adapter, as described above, is not required, and if such error signalling is not performed, the device adapter simply initiates the double data path reversal signalling described above in connection with the Write Without Error dialogue sequence.

For an understanding of the concept of the instant invention, the following clarifying explanation is now provided. The information transferred over the Data Bus is basically of two kinds: (i) data and (ii) command or control information; i.e., the address of a location in a peripheral unit in which data is to be stored.

An error in data being transferred does not impair the succeeding operations, nor does it damage other information. For example, if the peripheral unit is a printer and if the information being transferred represents a character to be printed, an error in the coding of such character causes the printing of a character other than that intended, but will have no other effect. However, an error in command or control information being transferred may seriously affect the succeeding operations and may damage other information. For example, if the peripheral unit is a disk memory unit and the information being transferred is control information for addressing a track of a disk, an error in such control information may lead to the erasing or recording of information in a wrong zone of the disk, with the consequent loss of information already contained in that zone.

Accordingly, the detection of an error in data being transferred does not require immediate error notification, and the device adapter may defer notification of such error to the end of the operation in execution. However, the detection of an error in command or control information being transferred requires immediate error notification.

For the diagnosis of errors, it is necessary that the computer system be able to distinguish between the various possible kinds of errors which occur. Thus, as will be described hereinafter, a parity error in the information being transferred is basically due to faulty operation of the interface. This is because, according to the instant invention, the parity bit for each byte of information being transferred is generated immediately upstream of the interface and checked immediately downstream of the interface. Accordingly, if a parity error is detected, it must be attributed to faulty operation of the interface, either because of an electrical fault or because of an electrical disturbance, such as noise.

Another kind of error which may be detected is of a logical nature. For example, certain binary codes are assigned to specify respective commands or control information and the remaining possible codes are not assigned and, therefore, are considered illegal. The allowable codes may be recognized and distinguished from those which are illegal by means of decoding networks. Further, data may be required to have a particular format; for example, numerical data in unpacked form is represented by a 4-bit character and may be accompanied by another 4-bit character or zone. Such zone characterizes the data as being of the unpacked decimal form. In addition, the zone character may be coded and employed for controlling certain functions.

Therefore, if it is determined that the data being transferred is not of a particular kind required to be transferred, the error so detected is considered to be a logical error; for example, where the data to be transferred is specified to be unpacked decimal data, but the data sensed is not an unpacked decimal digit.

Such logical errors cannot be attributed to interface malfunctioning, but rather to faulty operation of the central processor. However, it is not within the scope of the instant invention to determine whether errors attributable to the central processor are more specifically attributable to faulty programming or hardware failure. Instead, it is sufficient that the interface can be excluded as the source of an error of this type.

Therefore, it is apparent that parity errors may be said to be external errors and other types of errors may be said to be internal errors. This distinction between internal errors and external errors, in the function of error detection, is provided by the signal EV3. In the immediately preceding description, the exchange of the signals CSI and CSO during a phase of dialogue inversion was indicated as providing notification of the detection of an error, either internal or external. If, during such exchange of signals CSI and CSO, signal EV3 is in the 1-state, the error which has been detected is characterized as an external, or interface, error. On the other hand, if during such signal exchange, the signal EV3 is in the 0-state, the error which has been detected is characterized as an internal error.

READ WITHOUT ERROR

Figure 8:
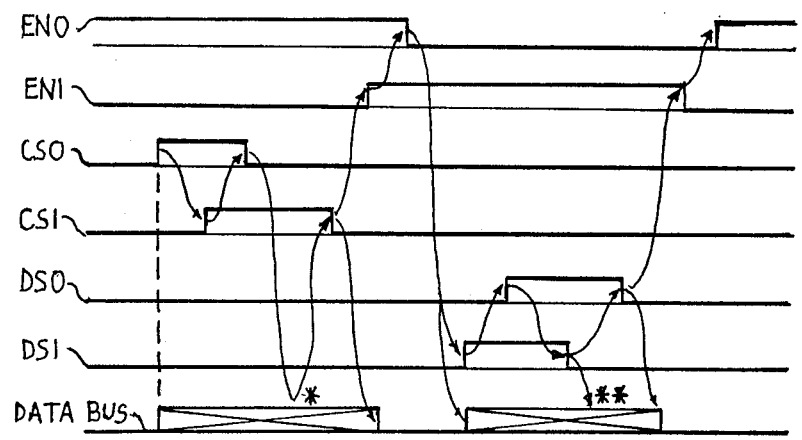

This dialogue sequence is initiated when interface module 23 transfers signal CSO to the 1-state, FIG. 8, and simultaneously applies control information signals to the Data Bus, which initiation takes place only after the interface module has verified that the signal ENO is in the 1-state and the signal ENI is in the 0-state. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. When the signal CSI is subsequently transferred to the 0-state by device adapter 20, such transition is notification to interface module 23 that it can remove the control information signals from the Data Bus.

The control information so accepted by device adapter 20 is now stored by the device adapter, because such control information represents the destination or the source of the data that next is to be transferred over the interface. Such control information is then interpreted by device adapter 20 as an instruction and is decoded by the device adapter to determine the next step to occur in the dialogue sequence. In the Read Without Error dialogue sequence, this next step will be a data-in information transfer to be initiated by device adapter 20.

Accordingly, device adapter 20 next transfers the signal ENI to the 1-state. When interface module 23 detects this transition in the state of the signal ENI, it transfers the signal ENO to the 0-state. When device adapter 20 detects this transition in the state of the signal ENO, it transfers the signal DSI to the 1-state and simultaneously applies data signals to the Data Bus. When interface module 23 detects this transition in the state of the signal DSI, it transfers the signal DSO to the 1-state. Device adapter 20 thereupon detects this transition in the state of the signal DSO and transfers the signal DSI to the 0-state. When interface module 23 detects this next transition in the state of signal DSI, to the 0-state, it then accepts the data signals from the Data Bus and transfers the signal DSO to the 0-state.

Upon detecting the transition of the state of the signal DSO to the 0-state, device adapter 20 thereupon transfers the signal ENI to the 0-state, in turn, causes interface module 23 to transfer the signal ENO to the 1-state. The integrated interface is thereupon ready to initiate another dialogue sequence.

READ OR WRITE WITH ERROR IN CONTROL INFORMATION

Figure 9:
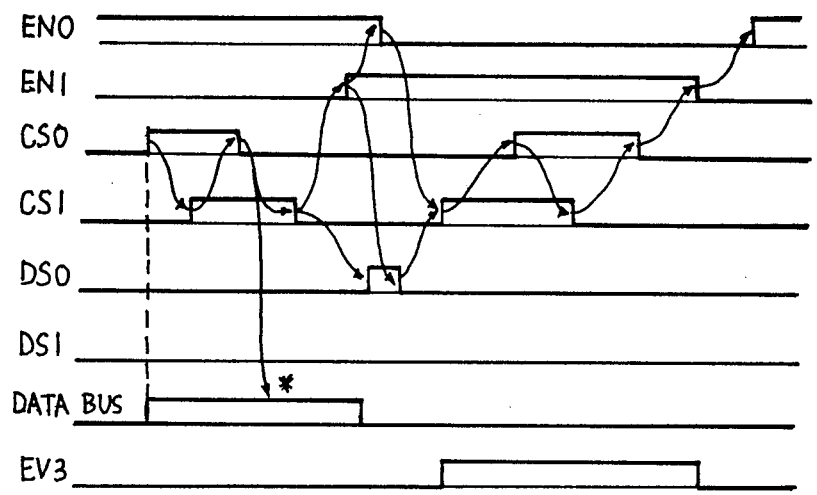

This dialogue sequence is initiated when interface module 23 transfers the signal CSO to the 1-state, FIG. 9, and simultaneously applies control information signals to the Data Bus, which initiation takes place only after the interface module has verified that the signal ENO is in the 1-state and the signal ENI is in the 0-state. When device adapter 20 detects this transition in the state of the signal CSO, it transfers the signal CSI to the 1-state. Interface module 23 thereupon detects this transition in the state of the signal CSI and transfers the signal CSO to the 0-state. When device adapter 20 detects this next transition of the signal CSO, to the 0-state, it then accepts the control information signals from the Data Bus. Such acceptance is designated by the single asterisk in FIG. 9.

Device adapter 20 now suspends the dialogue sequence in order to check the parity and validity of the control information byte received, by delaying the transfer of the signal CSI to the 0-state. When the signal CSI is finally transferred to the 0-state, such transition is notification to interface module 23 that it can remove the control information signals from the Data Bus and apply other information signals thereto.

The control information so accepted by device adapter 20 is now stored by the device adapter. Such control information is then interpreted by device adapter 20 as an instruction and is decoded by the device adapter to determine the next step to occur in the dialogue sequence.

In the instant dialogue sequence, device adapter 20 has detected an error in the control information byte received. Therefore, device adapter 20 not initiates a control-in information transfer.

Accordingly, device adapter 20 next transfers the signal ENI to the 1-state. When interface module 23 detects this transition in the state of the signal ENI, it transfers the signal ENO to the 0-state and also transfers the signal DSO to the 0-state if it had been in the 1-state. When device adapter 20 detects this transition in the state of signal ENO, it transfers the signal CSI to the 1-state. If signal EV3 is also in the 1-state, the error is denoted as being an external error. When interface module 23 detects this transition in the state of signal CSI, it transfers the signal CSO to the 1-state. The device adapter thereupon detects this transition in the state of signal CSO and transfers the signal CSI to the 0-state which, in turn, causes the interface module to transfer the signal CSO to the 0-state.

After the device adapter detects this latest transition of signal CSO, to the 0-state, it transfers the signal ENI to the 0-state which, in turn, causes interface module 23 to transfer the signal ENO to the 1-state, thereby permitting the integrated interface to initiate a new dialogue sequence.

INTERFACE CIRCUITS

The preceding description demonstrates that in both central processor 1 and device adapter 20, circuits must be provided specifically dedicated to supervising the transfer of information over channel 17. Certain of such circuits may be grouped, for convenience, into modular form such as interface module 23.

A preferred form of integrated interface module 23 is illustrated in the logical block diagrams of FIGS. 10–13. In these figures, a circle represents a logical AND-gate or set of AND-gates.

The symbol illustrated as a rising arrow opposite the input lead of an AND-gate represents that such AND-gate delivers a high-level output signal, representing a binary 1 and being the 1-state of such signal, at the time of occurrence of the leading (or rising) edge of the signal applied to such input lead, if all other input leads of such AND-gate are properly enabled. (An example of such a symbol is that shown opposite the upper input lead of AND-gate 137 in FIG. 10). The symbol illustrated as a falling arrow opposite the input lead of an AND-gate represents that such AND-gate delivers a high-level output signal, the 1-state of such signal, at the time of occurrence of the trailing (or falling) edge of the signal applied to such input lead, if all other input leads of such AND-gate are properly enabled. (An example of such a symbol is that shown opposite the upper input lead of AND-gate 139 in FIG. 10). Normally herein, when a signal is said to occur or to be present, it is in the 1-state.

A horizontal bar above a signal identifier or mnemonic represents the logical negation, or inversion, of the signal represented by such identifier without such bar. Such an inverted signal may be obtained from the uninverted, or direct, signal by means of a logical inverting circuit, or the equivalent, normally not illustrated.

When two or more signals are applied to a single line, an OR-gate is usually employed; however, for simplicity of illustration, such OR-gates have been omitted from the logical block diagrams of FIGS. 10–13.

Generally, the interface circuits receive microcommands from central processor 1, as well as signals under timing control of the internal timer of the central processor. Such interface circuits transmit to the central processor information signals which, with few exceptions, are also under timing control of the internal timer of the central processor.

In FIGS. 10–13, for clarity, the interface circuits are illustrated in separated groups; however, the circuits of such groups are actually interconnected. Such interconnection is accomplished by lines which transmit a particular identified signal from one circuit group, as an output signal therefrom, to another circuit group, as an input signal thereto.

When not otherwise specified, the same identifier is used for a circuit element as for the output signal delivered by such element.

Figure 10:
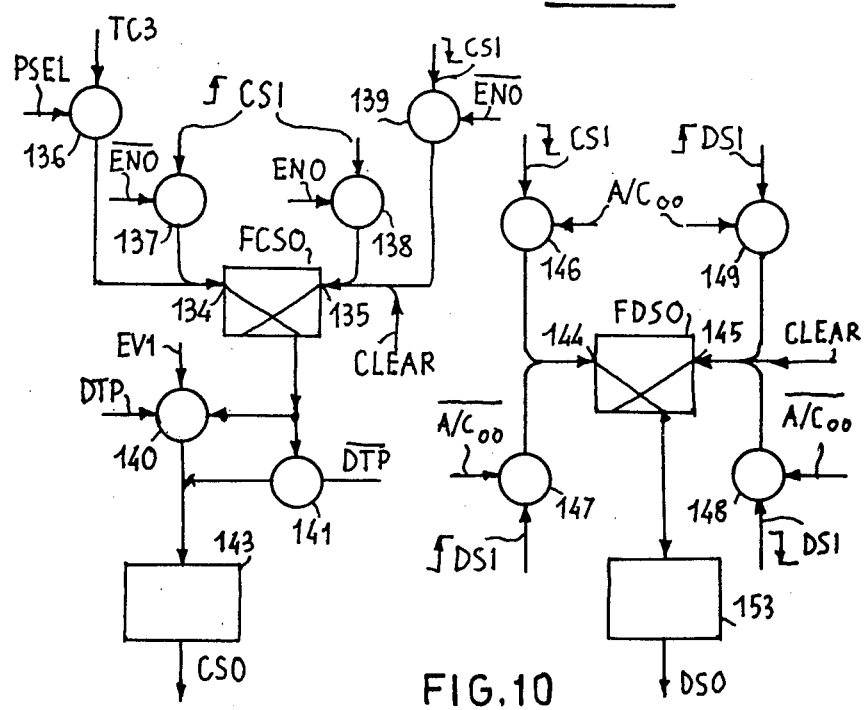
FIGS. 10–13 are logical block diagrams of a preferred form of the portion of the integrated interface of the instant invention embodied in the central processor.

The signal CSO is generated by circuits which comprise, FIG. 10, a flip-flop (bistable) FCSO. Flip-flop FCSO is provided with a 1-input (set) lead 134 and a 0-input (reset) lead 135. When a signal representing a binary 1 is applied to the 1-input lead of a flip-flop, the state of the flip-flop is transferred to represent a binary 1, the 1-state of the flip-flop; and when a signal representing a binary 1 is applied to the 0-input lead, the state of the flip-flop is transferred to represent a binary 0, the 0-state of the flip-flop. The output leads of AND-gates 136 and 137 are coupled to 1-input lead 134 and the output leads of AND-gates 138 and 139 are coupled to 0-input lead 135. The 1-output (direct) lead of flip-flop FCSO (the output lead illustrated) is coupled to respective input leads of AND-gates 140 and 141. (The 1-output lead of a flip-flop delivers an output signal representing a binary 1 when the flip-flop is in the 1-state.)

The output leads of AND-gates 140 and 141 are coupled to the input lead of a line driver 143.

Flip-flop FCSO is transferred to the 1-state (set) by a microcommand TC3, applied to one input lead of AND-gate 136, when a signal PSEL (PORT SELECT), an interface channel selection signal, applied to the other input lead of AND-gate 136, is present to enable such gate. (The signal PSEL is generated by central processor 1). Fli-flop FCSO is also transferred to the 1-state by the leading edge of the signal CSI, applied to one input lead of AND-gate 137, when a signal $\overline{ENO}$, applied to the other input lead of AND-gate 137, is present to enable such gate. Accordingly, AND-gate 137 delivers an output signal to transfer flip-flop FCSO to the 1-state when the leading edge of signal CSI occurs while signal ENO is in the 0-state which, as described above, takes place during a dialogue sequence wherein an error is detected by the device adapter.

Flip-flop FCSO is transferred to the 0-state (reset) by a signal CLEAR generated by central processor 1 during an initialization process. Flip-flop FCSO is also transferred to the 0-state by the leading edge of the signal CSI, applied to one input lead of AND-gate 138, when signal ENO, applied to the other input lead of AND-gate 138, is present to enable such gate. Accordingly, AND-gate 138 delivers an output signal to transfer flip-flop FCSO to the 0-state when the leading edge of signal CSI occurs while signal ENO is in the 1-state, which takes place during a dialogue sequence wherein there is a transfer of information from the central processor to a peripheral unit. Flip-flop FCSO is also transferred to the 0-state by the trailing edge of signal CSI, applied to one input lead of AND-gate 139, when the signal $\overline{ENO}$, applied to the other input lead of AND-gate 139, is present to enable such gate. Accordingly, AND-gate 139 delivers an output signal to transfer flip-flop FCSO to the 0-state when the trailing edge of signal CSI occurs while signal ENO is in the 0-state, which takes place during a dialogue sequence wherein an error is detected by the device adapter.

The output signal FCSO delivered by the 1-output lead of flip-flop FCSO is transmitted to line driver 143, through two alternate paths. One such path, comprising AND-gate 140, which transmits signal FCSO when both a signal DTP ("Data Transfer Phase") generated by flip-flop FIG. 13, applied to one input lead of AND-gate 140, and signal EV1, applied to another input lead of AND-gate 140, are present to enable such gate. Accordingly, AND-gate 140 passes the signal FCSO in the presence of an interrupt request from device adapter 20 for a character transfer, as represented by the signal EV1. The other path for transmittal of signal FCSO comprises AND-gate 141, which transmits signal FCSO when the signal $\overline{DTP}$ (present in non-data transfer phases), applied to one input lead of AND-gate 141, is present to enable such gate. Accordingly, AND-gate 141 passes the signal FCSO without delay during phases which are not data transfer phases. Line driver 143 delivers signal CSO upon receipt of signal FCSO.

The signal DSO is generated by circuits which comprise, FIG. 10, a flip-flop FDSO. Flip-flop FDSO is provided with a 1-input lead 144 and a 0-input lead 145. The output leads of AND-gates 146 and 147 are coupled to 1-input lead 144 and the output leads of AND-gates 148 and 149 are coupled to 0-input lead 145. The 1-output lead of flip-flop FDSO is coupled to the input lead of a line driver 153.

Flip-flop FDSO is transferred to the 1-state by the trailing edge of the signal CSI, applied to one input lead of AND-gate 146, when a signal $A/C_{00}$, applied to the other input lead of AND-gate 146, is present to enable such gate. Signal $A/C_{00}$ will be shown hereinafter to correspond to bit 00 of the previously-mentioned control character, and is the bit of such character which represents the direction of transfer. Flip-flop FDSO is also transferred to the 1-state by the leading edge of the signal DSI, applied to one input lead of AND-gate 147, when a signal $\overline{A/C_{00}}$, applied to the other input lead of AND-gate 147, is present to enable such gate.

Flip-flop FDSO is transferred to the 0-state by the signal CLEAR. Flip-flop FSCO is also transferred to the 0-state by the trailing edge of the signal DSI, applied to one input lead of AND-gate 148, when the signal $\overline{A/C_{00}}$, applied to the other input lead of AND-gate 148, is present to enable such gate. Flip-flop FDSO is also transferred to the 0-state by the leading edge of the signal DSI, applied to one input lead of AND-gate 149, when signal $A/C_{00}$, applied to the other input lead of AND-gate 149, is present to enable such gate. Accordingly, AND-gates 146–149 deliver output signals to transfer flip-flop FDSO between its 0-state and its 1-state as the direction of information transfer is designated as being toward the device adapter, indicated by signal $A/C_{00}$, or toward the central processor, indicated by signal $\overline{A/C_{00}}$.

Line driver 153 delivers signal DSO when the signal FDSO is in the 1-state.

Figure 11:
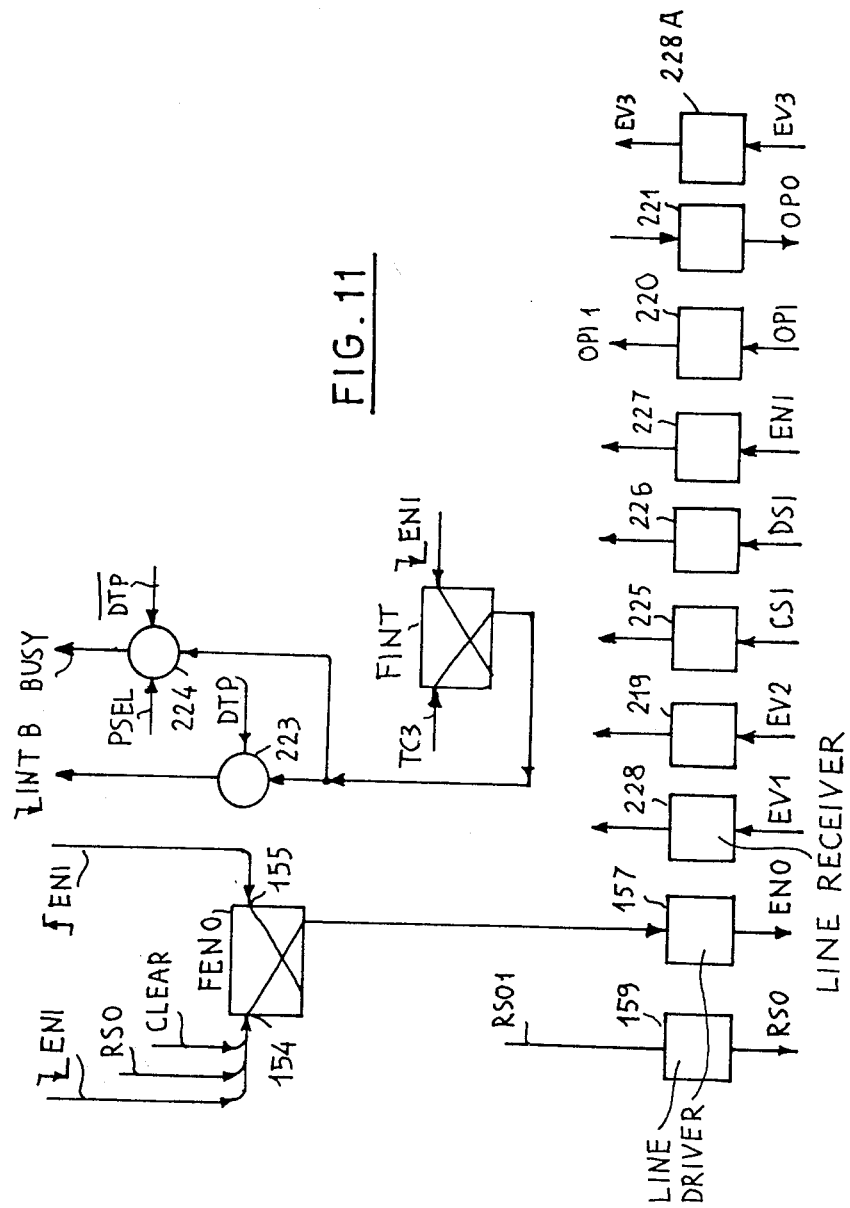

The signal ENO is generated by circuits which comprise, FIG. 11, a flip-flop FENO. Flip-flop FENO is provided with a 1-input lead 154 and a 0-input lead 155. The 1-output lead of flip-flop FENO is coupled to the input lead of a line driver 157.

In direct implementation of the conditions for the presence of the signal ENO and its interrelationship with the signal ENI, flip-flop FENO is transferred to the 1-state by the initializing, or clearing, signals RSO and CLEAR, and by the trailing edge of the signal ENI, all applied directly to the 1-input lead 154, and is transferred to the 0-state by the leading edge of signal ENI, applied directly to the 0-input lead 155.

Line driver 157 delivers signal ENO when the signal FENO is in the 1-state.

Figure 12:
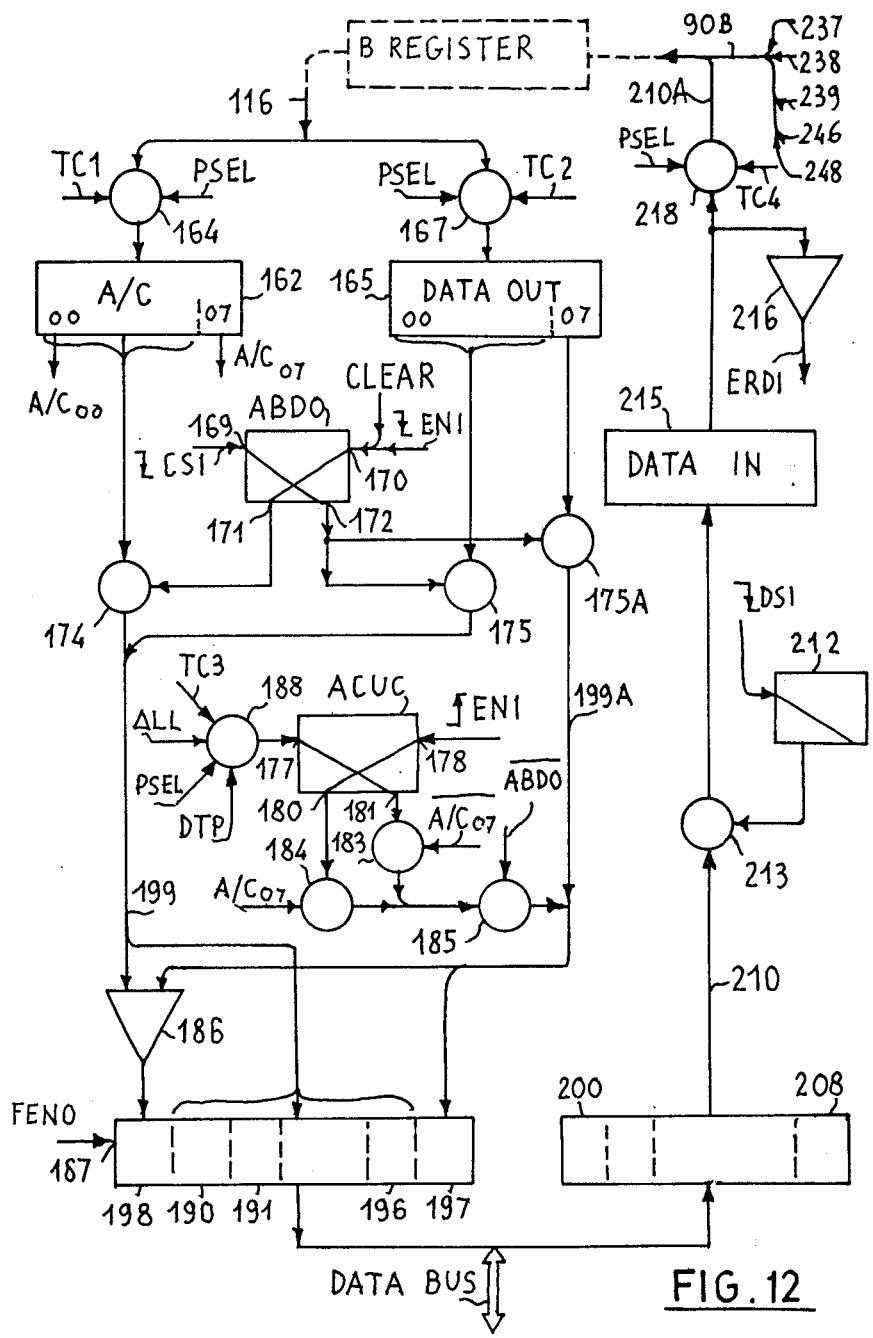

Circuits for controlling the transfer of information between the Data Bus and the aformentioned apparent B Register in logical unit 3A, FIG. 3, are illustrated in FIG. 12. These circuits comprise an A/C Register 162 for storing a control character. An AND-gate set 164 is coupled to receive signals representing the information held in the B Register and to transfer such signals to the A/C Register upon receipt of a microcommand TC1, applied to one input lead of AND-gate set 164, when the signal PSEL (PORT SELECT), applied to the other input lead of AND-gate set 164, is present to enable such gate set.

The A/C Register holds the eight control bits of a control character in respective bit positions 00–07 thereof. Signal $A/C_{00}$, representing bit 00 stored in the A/C Register, is employed, as described above, to control the changes of state of flip-flop FDSO, FIG. 10.

A DATA OUT Register 165 holds eight bits, FIG. 12. An AND-gate set 167 is coupled to receive signals representing the information held in the B Register and to transfer such signals to the DATA OUT Register upon receipt of a microcommand TC2, applied to one input lead of AND-gate set 167, when the signal PSEL, applied to the other input lead of AND-gate set 167, is present to enable such gate set.

The transfer of signals representing the contents of the A/C Register and the DATA OUT Register is controlled by AND-gate sets 174 and 175, by AND-gate 175A and by a flip-flop ABDO. Flip-flop ABDO is provided with a 1-input lead 169 and a 0-input lead 170. Flip-flop ABDO is provided with a 1-output lead 172, which delivers the signal ABDO, and a 0-output lead 171, which delivers the signal $\overline{ABDO}$. Output lead 171 is connected to one input lead of AND-gate set 174 and output lead 172 is connected to one input lead of AND-gate set 175, whereby the complementary output signals ABDO and $\overline{ABDO}$ alternately enable AND-gate sets 175 and 174. Output lead 172 is also connected to one input lead of AND-gate 175A to enable such gate when flip-flop ABDO is in the 1-state. Flip-flop ABDO is transferred to the 1-state by the trailing edge of signal CSI, applied directly to the 1-input lead 169. Flip-flop ABDO is transferred to the 0-state by the signal CLEAR and by the trailing edge of the signal ENI, both applied directly to the 0-input lead 170.

AND-gate set 174 is coupled to receive signals representing bits 00–06 held in the A/C Register and AND-gate set 175 is coupled to receive signals representing bits 00–06 held in the DATA OUT Register. Seven line drivers 190–196 are coupled by a channel 199 to the output leads of both of AND-gate sets 174 and 175. Therefore, according to the state of flip-flop ABDO, either AND-gate set 174 or and-gate 175 is enabled to pass through channel 199 to line drivers 190–196 signals representing bits 00–06 of either the contents of the A/C Register or of the DATA OUT Register. The signals applied to line drivers 190–196 are transferred therethrough to the Data Bus.

One input lead of AND-gate 175A is coupled to an output lead of the DATA OUT Register to receive a signal representing bit 07 stored in the DATA OUT Register. The input lead of a line driver 197 is coupled by a lead 199A to the output lead of AND-gate 175A. Accordingly, AND-gate 175A is enabled to pass a signal representing bit 07 in the DATA OUT Register to line driver 197 when flip-flop ABDO is in the 1-state.

Bit 07 of the control character held in the A/C Register is transferred through the interface in a different manner from the transfer of bit 07 in the DATA OUT Register. Signals $A/C_{07}$ and $\overline{A/C_{07}}$, which represent respectively bit 07 in the A/C Register and the logical inverse, or complement, of such bit 07, are selectively transferred under control of a flip-flop ACUC.

Flip-flop ACUC is provided with a 1-input lead 177 and a 0-input lead 178. Flip-flop ACUC is provided with a 1-output lead 181, which delivers the signal ACUC, and a 0-output lead 180, which delivers the signal ACUC. Output lead 180 is connected to one input lead of an AND-gate 184 and output lead 181 is connected to one input lead of an AND-gate 183. The other input lead of AND-gate 184 receives the signal $A/C_{07}$ and the other input lead of AND-gate 183 receives the signal $\overline{A/C_{07}}$.

One input lead of an AND-gate 185 is coupled to the output leads of both AND-gates 183 and 184. The other input lead of AND-gate 185 is coupled to receive the signal $\overline{ABDO}$. The output lead of AND-gate 185 is coupled to lead 199A and, therefore, to the input lead of line driver 197. Therefore, according to the state of flip-flop ACUC, and when AND-gate 185 is enabled by the presence of the signal $\overline{ABDO}$, either AND-gate 183 or 184 is enabled to pass the respective signal $\overline{A/C_{07}}$ or $A/C_{07}$ to line driver 197.

The 1-input lead of flip-flop ACUC is connected to the output lead of an AND-gate 188. Flip-flop ACUC is transferred to the 1-state by a combination of signals applied to AND-gate 188, as will be described more fully hereinafter. Flip-flop ACUC is transferred to the 0-state by the leading edge of signal ENI appllied directly to 0-input lead 178.

Finally, the circuits for controlling the transfer of information from the B Register to the Data Bus comprise a parity bit generation network 186. Network 186 may comprise, for example, a plurality of Exclusive-OR logical elements, appropriately cascaded and interconnected. Network 186 is coupled to receive the signals transmitted by channel 199 and line 199A, such signals collectively representing the eight information bits of a control character or an item of data, and to respond to such signals to deliver an output signal representing a parity bit for such eight information bits. A line driver 198 is coupled to the output lead of network 186 to receive therefrom the signal representing the parity bit of the information represented by the eight signals transmitted by line drivers 190–197.

Because the Data Bus is bidirectional, line drivers 190–198 are provided with an enabling input lead 187, whereby such line drivers are enabled to apply signals to the Data Bus only when information is required to be transferred from interface module 23 to device adapter 20. Accordingly, lead 187 is coupled to receive the signal FENO, FIG. 11.

The circuits of FIG. 12 which control the transfer of information from the Data Bus to the B Register comprise line receivers 200–208 and a DATA IN Register 215. Line receivers 200–208 are coupled to receive the signals transferred over the Data Bus and to apply such signals to a channel 210.

An AND-gate set 213 is coupled, at one input lead thereof, to receive the signals transmitted by channel 210 and to transfer such signals to the DATA IN Register when enabled by the output signal of a one-shot 212, which is applied to the other input lead of AND-gate set 213. One-shot (monostable or univibrator) 212 is provided with a trigger input lead, which is coupled to receive the signal DSI. One-shot 212 is triggered by the trailing edge of signal DSI to deliver an output signal of predetermined duration. Accordingly, when the trailing edge of signal DSI triggers one-shot 212, gate set 213 is enabled to transfer signals representing the information on the Data Bus to the DATA IN Register for storage therein.

An AND-gate set 218 controls the transfer of signals from the DATA IN Register to the B Register. AND-gate set 218 is coupled, at one input lead thereof, to receive signals representing the information held in the DATA IN Register and to transfer such signals to the B Register, over a channel 210A, upon receipt of a microcommand TC4, applied to another input lead of AND-gate set 218, when the signal PSEL, applied to the other input lead of AND-gate set 218, is present to enable such gate set. Both microcommand TC4 and signal PSEL are supplied by central processor 1.

A parity check network 216 is coupled to receive signals representing the contents of DATA IN Register and to generate an output signal ERDI when such network detects a parity error in the information represented by such signals.

Certain circuits, FIG. 11, in module 23 are provided simply to transfer signals through the module. Such circuits comprise line receivers 219 and 220, and line drivers 159 and 221. Line driver 159 is coupled to receive a microcommand RSO1 from central processor 1 and to transfer such signal over the interface as the signal RSO. Line driver 221 is coupled to receive the signal OPO from central processor 1 and to transfer such signal over the interface. Line receiver 219 is coupled to receive the signal EV2 from the integrated interface and to tranfer such signal to the central processor. Line receiver 220 is coupled to receive the signal OPI from the integrated interface and to transfer such signal to the central processor as the signal OPI1.

On the other hand, line receivers 225, 226, 227, 228, and 228A, coupled to receive the respective signals CSI, DSI, ENI, EV1, and EV3 from the integrated interface, do not transfer such signal directly to the central processor, but instead, deliver these signals for employment within interface module 23.

As has been described previously herein, the signal EV1 indirectly generates an interrupt request for a character transfer by indirectly causing generation of the signal INTB. As has been described above in connection with the generation of signal CSO, FIG.10, certain previously described dialogue sequences commence with the generation of signal CSO which, in turn, is caused by the receipt of signal EV1. At the conclusion of such dialogue sequences, the transfer of the signal ENI to the 0-state is interpreted as a data transfer phase, by the consequent generation of signal INTB, which denotes an interrupt request for a character transfer.

The signal INTB is generated by circuits which comprise, FIG. 11, a flip-flop FINT. Flip-flop FINT is transferred to the 1-state by the microcommand TC3, applied directly to the 1-input lead of flip-flop FINT. Flip-flop FINT is transferred to the 0-state by the trailing edge of the signal ENI, applied directly to the 0-input lead of flip-flop FINT. The 1-output lead of flip-flop FINT is coupled to one input lead of each of AND-gates 223 and 224. The other input lead of AND-gate 223 is coupled to receive the signal DTP and the other input leads of AND-gate 224 are coupled to receive the signal PSEL and $\overline{DTP}$. Accordingly, AND-gate 224 delivers an output signal, designated as the signal BUSY, for the entire duration of a dialogue sequence which is not a data transfer phase. The signal BUSY represents to central processor 1 that interface module 23 is occupied in executing a dialogue sequence.

The output signal of AND-gate 223 is designated as the signal INTB. The trailing edge of signal INTB is delivered by AND-gate 223 when flip-flop FINT is transferred to the 0-state by the trailing edge of signal ENI, when AND-gate 223 is enabled by the signal DTP.

Such trailing edge of signal INTB represents an interrupt request signal and is applied to a priority network in the central processor where a pre-established priority level is allocated and stored for such request (more fully described in the above-identified patent application Ser. No. 576,523).

Figure 13:
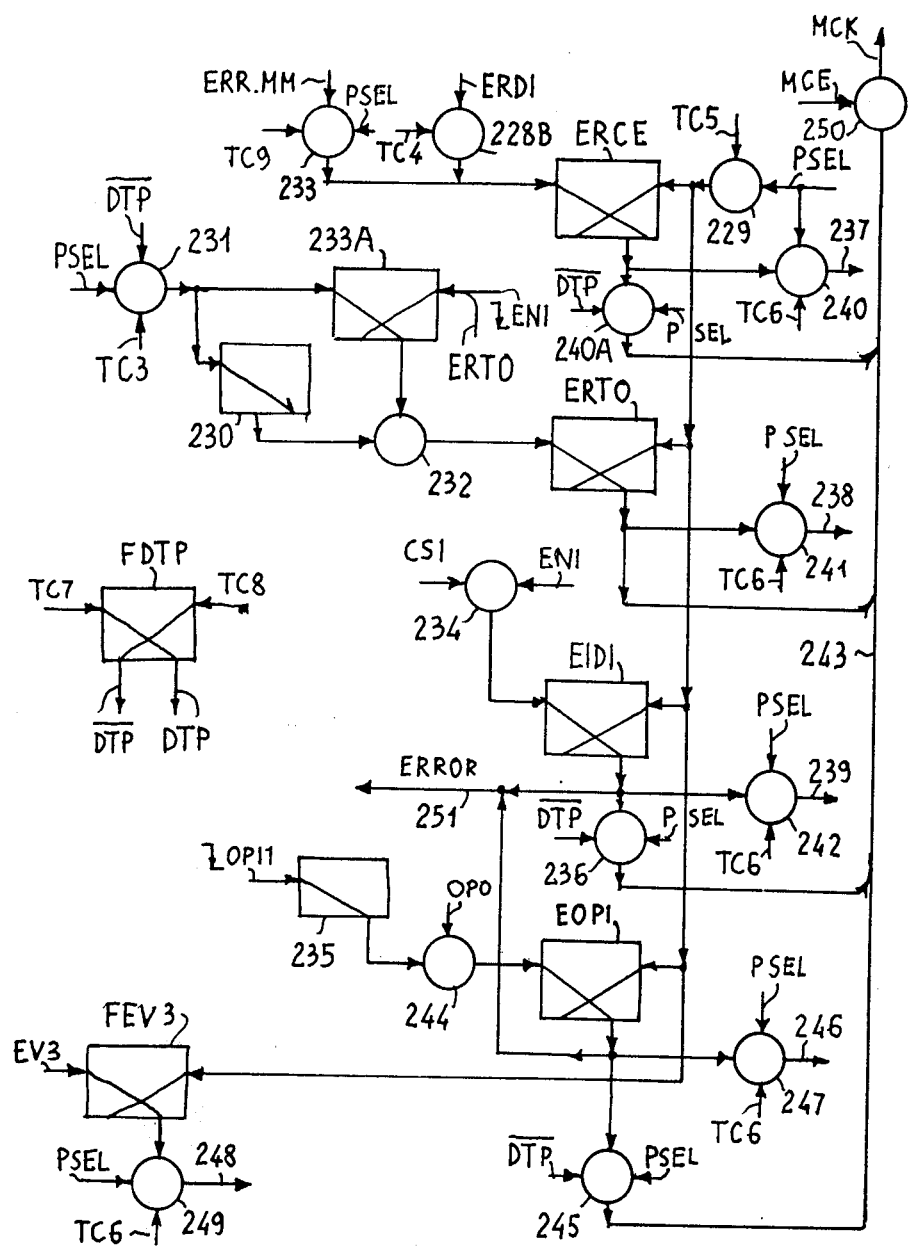

Circuits are also provided in interface module 23, FIG. 13, for detecting and providing notification of errors. Such circuits comprise flip-flops ERCE, ERTO, EIDI, and EOPI, designated herein as diagnostic flip-flops.

Flip-flop ERCE provides notification of a parity error in information to be transferred to or received from the Data Bus. The 1-input lead of flip-flop ERCE is connected to the output leads of AND-gates 228B and 233 and the 0-input lead of the flip-flop is connected to the output lead of an AND-gate 229. Flip-flop ERCE is transferred to the 1-state by signal ERDI, applied to one input lead of AND-gate 228B, when the microcommand TC4 is applied to the other input lead of AND-gate 228B. Signal ERDI is described above as being generated by parity check network 216, FIG. 12, when a parity error is detected in information received from the Data Bus, and microcommand TC4 has been described as enabling the transfer of information from the Data Bus to the B Register. Flip-flop ERCE is also transferred to the 1-state by signal ERR MM, applied to one input lead of AND-gate 233, upon receipt of a microcommand TC9, applied to one input lead of such gate, when the signal PSEL, applied to one input lead of such gate is present to enable AND-gate 233. Signal ERR MM is described above as being generated by parity control network 120A, FIG. 4, when a parity error is detected in the contents of the DATA register of main memory 2. Microcommand TC9 is generated by control unit 3B when the information retrieved from the read/write store of main memory 2 is to be transferred to a peripheral unit. In such instance, such retrieved information is transferred from the DATA register to register bank 72 of logical unit 3A, FIG. 3, and from register bank 72 over channel 80, through AND-gate set 111, and over channel 116, FIG. 12, to the selected peripheral unit.

Flip-flop ERCE is transferred to the 0-state by a microcommand TC5 (ERROR RESET), applied to one input lead of AND-gate 229, FIG. 13, when the signal PSEL (PORT SELECT), applied to the other input lead of AND-gate 229, is present to enable such gate. Accordingly, the signal ERCE delivered by the 1-output lead of flip-flop ERCE provides notification that a parity error is detected in information to be transferred to or received from the Data Bus.

Flip-flop ERTO provides a time-out error notification; i.e., a notification that a dialogue sequence has failed to be completed within a predetermined interval, which is a requirement in certain phases such as command transmitting or status receiving phases. A measure of this predetermined maximum interval permitted a dialogue sequence is provided by a one-shot 230. The trigger input lead of one-shot 230 is coupled to the output lead of an AND-gate 231. Accordingly, one-shot 230 is triggered by microcommand TC3, applied to one input lead of AND-gate 231, when the signals $\overline{DTP}$ and PSEL, applied to the respective other input leads of AND-gate 231, are present to enable such gate. Such microcommand TC3 is the microcommand which initiates generation of the signal CSO, FIG. 10, to initiate a dialogue sequence.

A flip-flop 233A is employed to suppress the time-out error notification when the dialogue sequence is completed within the allotted time. The 1-input lead of flip-flop 233A is coupled to the output lead of AND-gate 231. Accordingly, at the same time that the output signal of AND-gate 231, delivered in response to microcommand TC3, triggers one-shot 230, it also transfers flip-flop 233A to the 1-state. Flip-flop 233A is transferred to the 0-state by the signal ERTO and by the trailing edge of the signal ENI, both applied directly to the 0-input lead of flip-flop 233A.

One input lead of an AND-gate 232 is connected to the output lead of one-shot 230 and the other input lead of such AND-gate is connected to the 1-output lead of flip-flop 233A. The 1-input lead of flip-flop ERTO is connected to the output lead of AND-gate 232, and the 0-input lead of flip-flop ERTO is connected to the output lead of AND-gate 229. Accordingly, at the termination of the output signal of one-shot 230, which occurs at a predetermined time after the one-shot is triggered, a time determined by the parameters of the one-shot, AND-gate 232 delivers an output signal to transfer flip-flop ERTO to the 1-state, provided that AND-gate 232 is enabled by the 1-output signal of flip-flop 233A, which enabling occurs if flip-flop 233A is still in the 1-state. Accordingly, the ERTO flip-flop is transferred to the 1-state only if a dialogue sequence is not completed prior to the end of the termination of the output signal of one-shot 230. Therefore, the signal ERTO delivered by the 1-output lead of flip-flop ERTO provides notification that the dialogue sequence has not been completed within the appropriate time. Flip-flop ERTO is transferred to the 0-state by microcommand TC5, applied to one input lead of AND-gate 229, when the signal PSEL, applied to the other input lead of AND-gate 229, is present to enable such gate.

Flip-flop EIDI provides notification that a "dialogue inversion" has occurred as a consequence of the detection by the device adapter of a parity error or a logical error. Such dialogue inversion has been described previously herein in connection with dialogue sequences in which errors occur and in which, as a result, the device adapter transfers the signal ENI and then the signal CSI to the 1-state. The 1-input lead of flip-flop EIDI is connected to the output lead of an AND-gate 234 and the 0-input lead of the flip-flop is connected to the output lead of an AND-gate 229. Flip-flop EIDI is transferred to the 1-state by the presence of the signal CSI, applied to 1 input-lead of AND-gate 234, when the signal ENI, applied to the other input lead of AND-gate 234, is present to enable such gate. Thus, the signal EIDI delivered by the 1-output lead of flip-flop EIDI provides notification that such a dialogue inversion has occurred. Flip-flop EIDI is transferred to the 0-state by the microcommand TC5, applied to one input lead of AND-gate 229, when the signal PSEL, applied to the other input lead of AND-gate 229, is present to enable such gate.

Flip-flop EOPI provides notification that device adapter 20, or a peripheral unit coupled to device adapter 20, is not operational, such as by virtue of not being energized by the power supply. The trigger input lead of a one-shot 235 is coupled to receive the signal OPI1 delivered by line receiver 220, FIG. 11. The signal OPI1 corresponds to the signal OPI, transmitted over the interface, FIG. 5, and when in the 0-state denotes that device adapter 20 is not operational. Accordingly, one-shot 235 is triggered when signal OPI1 transfers to the 0-state.

One input lead of an AND-gate 244 is connected to the output lead of one-shot 235. The 1-input lead of flip-flop EOPI is connected to the output lead of AND-gate 244, and the 0-input lead of flip-flop EOPI is connected to the output lead of AND-gate 229. Accordingly, at the termination of the output signal of one-shot 235, which occurs at a predetermined time after the one-shot is triggered, a time determined by the parameters of the one-shot, AND-gate 244 delivers an output signal to transfer flip-flop EOPI to the 1-state, provided that the signal OPO, applied to the other input lead of AND-gate 244, is present to enable such gate.

Flip-flop EOPI is transferred to the 0-state by microcommand TC5, applied to one input lead of AND-gate 229, when the signal PSEL, applied to the other input lead of AND-gate 229, is present to enable such gate.

The 1-output signals of diagnostic flip-flops ERCE, ERTO, EIDI, and EOPI are transmitted to a single line 243 which, in turn, is coupled to central processor 1. The signals transmitted on line 243 are designated collectively as the signal MCK. Accordingly, whenever an error or fault occurs which causes one of flip-flops ERCE, ERTO, EIDI, or EOPI to be transferred to the 1-state, the output signal of such flip-flop provides the signal MCK on line 243 that represents generically the occurrence of an error.

More specifically, the 1-output lead of flip-flop ERCE is connected to one input lead of an AND-gate 240A, the 1-output lead of flip-flop EIDI is connected to one input lead of an AND-gate 236, and the 1-output lead of flip-flop EOPI is connected to one input lead of an AND-gate 245. Accordingly, when any one of flip-flops ERCE, EIDI, or EOPI is in the 1-state, as the result of an error or fault condition, the respective one of AND-gates 240A, 236, and 245 transmits the 1-output signal of such flip-flop to line 243, provided that the signals PSEL and $\overline{DTP}$, applied to the other input leads of such AND-gates, are present to enable such gates. On the other hand, the 1-output lead of flip-flop ERTO is coupled directly to line 243.

Flip-flop FEV3 stores a representation of the occurrence of signal EV3, transmitted over the interface, FIG. 5, and providing notification from device adapter 20 that a parity error has been detected in control information. Flip-flop FEV3 is transferred to the 1-state by the signal EV3, applied directly to the 1-input lead of the flip-flop. The 0-input lead of flip-flop FEV3 is connected to the output lead of AND-gate 229. Accordingly, flip-flop FEV3 is transferred to the 0-state by microcommand TC5, applied to one input lead of AND-gate 229, when the signal PSEL, applied to the other input lead of AND-gate 229, is present to enable such gate.

The 1-output leads of flip-flops ERCE, ERTO, EIDI, EOPI, and FEV3 are connected to one input lead of respective AND-gates 240, 241, 242, 247, and 249. One input lead of each of AND-gates 240, 241, 242, 247, and 249 is coupled to receive the signal PSEL and another input lead of such gates is coupled to receive the microcommand TC6. Respective output leads 237, 238, 239, 246, and 248 of AND-gates 240, 241, 242, 247, and 249 are coupled to channel 210A, FIG. 12. Accordingly, when any one of flip-flops ERCE, ERTO, EIDI, EOPI, or FEV3 is in the 1-state, as the result of an error or fault condition, the respective one of AND-gates 240, 241, 242, 247, and 249 transmits the 1-output signal of such flip-flop on channel 210A to the B register, provided that microcommand TC6 is generated and the signal PSEL is present to enable such gates. Microcommand TC6 is a signal provided by the central processor for the purpose of transferring signals representing errors to the B register.

OPERATION OF INTERFACE MODULE

The operation of interface module 23 will now be described with reference to the logical block diagrams of the circuits of the module, FIGS. 10–13, and the timing diagrams of the dialogue sequences of the interface, FIGS. 6–9.

A command phase is initiated when central processor 1 generates the signal PSEL and the microcommands TC1 and TC2, which function to load the A/C register with a control character and the DATA OUT Register with a command. The control character specifies the direction of the information transfer and the destination of such information. At this time, flip-flop FDTP is in the 0-state delivering the signal $\overline{DTP}$ which denotes that the integrated interface is not in a data transfer phase and, therefore, is in a command or status transfer phase. The signal PSEL may be generated in the central processor by other microcommands or appropriate flip-flops.

The control character contents of the A/C Register are immediately transferred through AND-gate set 174, enabled by the 0-state of flip-flop ABDO, which is initially in such state, and line drivers 190–198 to the Data Bus.

Central processor 1 next generates the microcommand TC3, which transfers flip-flop FCSO to the 1-state through AND-gate 136, then enabled by signal PSEL. Because signal $\overline{DTP}$ is enabling AND-gate 141, immediately upon the transfer of flip-flop FCSO to the 1-state, line driver 143 delivers the signal CSO, which initiates a dialogue sequence and provides notification that the information then present on the Data Bus is control information.

The dialogue sequence then proceeds in the manner described above, the device adapter responding to the transition in the signal CSO to transfer the signal CSI to the 1-state. The interface module 23 responds to the transition in the signal CSI, which passes through AND-gate 138, enabled by the signal ENO, to transfer flip-flop FCSO and, resultingly, signal CSO to the 0-state. Device adapter 20 thereupon accepts the control character from the Data Bus and subsequently transfers signal CSI to the 0-state.

This last-mentioned transition of signal CSI passes through AND-gate 146, enabled by signal $A/C_{00}$ which is in the 1-state because the control character in the A/C Register specifies the direction of information transfer to be toward the device adapter, to transfer the FDSO flip-flop to the 1-state. Accordingly, line driver 153 now delivers the DSO signal. Such trailing edge of the signal CSI also transfers flip-flop ABDO to the 1-state. The resulting ABDO signal enables AND-gate set 175 and AND-gate 175A to pass the command held in the DATA OUT Register to line drivers 190–198 and the Data Bus. The dialogue sequence now concludes, as described previously, by the exchange between interface module 23 and device adapter 20 of the signals DSO, DSI, ENI, and ENO. If an error is detected by the device adapter, there also takes place the additional exchange, described above, of the signals CSI and CSO with signal ENI in the 1-state.

During the duration of the dialogue sequence flip-flop FINT, which is transferred to the 1-state by microcommand TC3 at the beginning of the dialogue sequence, remains in the 1-state delivering the continuous signal BUSY through AND-gate 224, enabled by signal PSEL. The signal BUSY does not discontinue until the occurrence of the trailing edge of signal ENI, at the conclusion of the dialogue sequence, which transfers flip-flop FINT to the 0-state. The signal BUSY is employed to prevent the central processor from continuing to execute the microprogram beyond the point which started the command transfer phase. Such microprogram is suspended, for example, by inhibiting output from the store holding the microprogram by generation of the signal NOP, thereby disabling AND-gate 66A, FIG. 2, until the dialogue sequence is completed. Upon such completion the microprogram may be resumed, or a new microinstruction sequence may be initiated to start a new dialogue sequence and transfer a new command to the device adapter.

A status transfer phase follows a similar dialogue sequence to that of the command phase, the differences being described hereinafter. After microcommand TC1 has functioned to load the A/C Register with a control character, the central processor generates the microcommand TC3, which effectively starts the dialogue sequence. The signals CSO and CSI are exchanged between interface module 23 and device adapter 20 and the control character transmitted on the Data Bus is received by the device adapter.

The device adapter thereupon generates the ENI signal which now functions to effectively reverse the direction of information transfer on the Data Bus. The device adapter then transfers the signal DSI to the 1-state and simultaneously applies data signals representing the required information on the Data Bus. This transition in the signal DSI passes through AND-gate 147, which is enabled by the signal $A/C_{00}$ because the control character in the A/C Register specifies the direction of information transfer to be toward the central processor, to transfer the flip-flop FDSO to the 1-state. The resulting transfer of the signal DSO to the 1-state is detected by the device adapter 20 which thereupon transfers signal DSI to the 0-state. The trailing edge of signal DSI triggers one-shot 212 thereupon enabling AND-gate set 213 to transfer information from the Data Bus to the DATA IN Register. Dialogue sequence is then terminated as described previously. Again, in this dialogue sequence, the microprogram in the central processor is suspended by the signal BUSY until the dialogue sequence is completed. At the end of this dialogue sequence the microprogram is once again permitted to resume and a new microinstruction generates microcommand TC4, which enables AND-gate set 218 to transfer the contents of the DATA IN Register to the B Register of the central processor.

A dialogue sequence initiated by the delivery of a signal EV2 by the device adapter does not differ from those described above. Once the central processor has acknowledged signal EV2 and accepted the interrupt request represented thereby, it is the central processor which initiates the dialogue sequence to provide the necessary information transfer.

The operation of the integrated interface will now be described for the instance in which the command phase requests a data transfer operation. The command phase first proceeds in one or more dialogue sequences of the type described above. At the conclusion of the command phase the address of the register into which data is to be written or from which data is to be read is loaded into the A/C Register and, if data is to be written into a register, the first data character is loaded into the DATA OUT Register.

Flip-flop FDTP is then transferred to the 1-state by a microcommand TC7 and microcommand TC3 next is generated. Microcommand TC3 transfers flip-flops FCSO and FINT to the 1-state, as described above in connection with the command phase. However, in this instance, although the signal DTP is present, it only partially enables AND-gate 140, so that the FCSO signal cannot be transferred through AND-gate 140 to line driver 143 to generate the signal CSO until device adapter 20 provides request signal EV1 to complete the enabling of AND-gate 140. Accordingly, the dialogue sequence commences only when signal EV1 is applied to the input lead of AND-gate 140.

At the conclusion of this dialogue sequence, the transition of signal ENI to the 0-state causes flip-flop FINT to transfer to the 0-state and the consequent transfer to the 0-state of signal INTB through AND-gate 223, which is enabled by the signal DTP. This trailing edge of signal INTB is detected by the priority network in the central processor and is accorded recognition after interrupt requests allocated higher priority have been satisfied. The central processor thereupon causes a new data character to be loaded into the DATA OUT Register and microcommand TC3 is generated once again. A new dialogue sequence starts as soon as another signal EV1 is received, if it was not already present.

The dialogue sequence for data transfer is similar in the instance of data read from the device adapter. At the start of the data transfer, the central processor generates suitable commands and the A/C Register is loaded. Immediately after flip-flop FDTP is transferred to the 1-state, microcommand TC3 is generated. When the signal EV1 becomes available, the dialogue sequence begins and the first character supplied by the device adapter is accepted from the Data Bus and loaded into the DATA IN Register.

At the conclusion of such dialogue sequence the ENI signal transfers flip-flop FINT to the 0-state, and the signal INTB transfers to the 0-state. This transition in signal INTB is detected by the priority network of the central processor which upon serving higher priority requests accords recognition to the request represented by signal INTB. The central processor thereupon causes the transfer of the contents of the DATA IN Register to the B Register, and from the B Register to an appropriate main memory location. When this operation is completed the central processor generates a new microcommand TC3 to once again transfer flip-flops FCSO and FINT to the 1-state to initiate a new dialogue sequence when the signal EV1 becomes available.

The dialogue sequence by which the central processor notifies the device adapter that the data transfer operation must terminate will now be described. For this purpose, the control character transmitted with the last data character to be written or which requests the last data character to be read is appropriately modified by transferring flip-flop ACUC to the 1-state. As has been described above the address, or identification, of the two types of device adapter registers, into which data is written or from which data is retrieved, is suitably expressed by a six-bit code rather than requiring the entire seven-bit code held in the A/C Register. Therefore, bit 07 in the A/C Register is not necessary for such address and may selectively be placed in the 1-state or 0-state.

Accordingly, a specific control function may be attributed to bit 07 of the A/C Register; i.e., if such bit 07 is in the 0-state it may represent that the data character to be transferred is not the last character of the series being transferred, but if in the 1-state it may represent that the data character to be transferred is the last one of the series.

When the central processor recognizes that the data transfer operation must conclude upon transfer of the last data character of a series, it transmits a signal ALL to interface module 23. One manner in which such a signal ALL may be generated, is by the central processor repeatedly decrementing a character representing the length of the character transfer series, expressed as the number of characters to be transferred. Such a character may be held in an appropriate working register, and is decremented by 1 in the processing network of the central processor upon each data character transfer. The processing network detects when the number represented by such character is reduced to a predetermined value (1 or 0) and thereupon generates signal ALL.

The signal ALL is applied to one input lead of AND-gate 188, FIG. 12. Accordingly, AND-gate 188 delivers an output signal to transfer flip-flop ACUC to the 1-state upon receipt of signal ALL, when microcommand TC3 and signals PSEL and DTP, applied to respective other input leads of AND-gate 188, are present to enable such gate. The output signal ACUC delivered on output lead 181 of flip-flop ACUC thereupon enables AND-gate 183 to pass signal $\overline{A/C_{07}}$ through AND-gate 185, enabled by signal $\overline{ABDO}$, to lead 199A and, ultimately, to the device adapter as control information. Such signal provides notification to the device adapter, by representing the logical inverse, or complement, of bit 07 of the control character, that the data transfer operation must be terminated. In this manner, central processor 1 transmits a notification to device adapter 20 of the end of a data transfer operation, utilizing the existing structure of the Data Bus and without requiring an additional line in the interface or Data Bus.

ERROR DETECTION AND NOTIFICATION

The operation of the error detection and notification circuits will now be described.

ERCE CIRCUIT

Flip-flop ERCE provides notification of a parity error both in information received over the Data Bus from a peripheral unit and information to be transferred over the Data Bus to a peripheral unit.

The parity bit in information to be transferred over the Data Bus from a peripheral unit to the central processor is generated immediately before such information enters Data Bus, as will be described hereinafter. The subsequent parity check on such information is performed by parity check network 216 immediately after its receipt by interface module 23 and loading into the DATA IN register, FIG. 12. Thus, such parity check occurs before the information is actually transferred into the central processor. Accordingly, any parity error detected by parity check network 216 necessarily occurred while the information was passing over the Data Bus or through its associated line drivers and line receivers. It is apparent that such an error was caused either by an electrical fault or because of an electrical disturbance such as noise.

When network 216 detects a parity error in information received from the Data Bus, it generates a signal ERDI to provide notification of such parity error. Signal ERDI is passed by AND-gate 228B, FIG. 13, and transfers flip-flop ERCE to the 1-state, in which state the flip-flop represents the occurrence of such parity error. However, the subsequent operation of the system differs according to whether such parity error was detected during a data transfer phase or during a command or control information transfer phase.

If such error is detected during the transfer of command or control information (i.e., the status of a peripheral subsystem) from device adapter 20 to the central processor, the signal $\overline{DTP}$ (present in nondata transfer phases) enables AND-gate 240A and, provided such AND-gate is enabled by the signal PSEL, the 1-output signal of flip-flop ERCE, which represents such error, is passed through AND-gate 240A to line 243. AND-gate 250, enabled by the signal MCE, which is normally present, passes such error signal on line 243 to the central processor as signal MCK. Appropriate circuits in the central processor, not shown, respond to signal MCK to perform the following functions;

a. blocking I/O control unit 3 in its current state;

b. supplying on channel 58A of control unit 3B a fixed ROS address, as represented by the MCK signal, FIG. 2, such address pointing to a particular microprogram for performing the diagnostic function of identifying the nature of the error and, in certain instances, the sources thereof; and c. transferring signal MCE to the 0-state in order to block transfer of signal MCK.

The central processor then initiates execution of the microprogram called from the fixed address represented by signal MCK and, after determining that the error involved relates neither to the ROS nor to arithmetic/logic network 73 (the description of such microprogram being beyond the scope of the instant invention), such microprogram attempts to identify the sources of the error. To this end, the central processor thereupon generates the microcommand TC6, and because signal PSEL is present as a consequence of the blocking of I/O control unit 3, the states of flip-flops ERCE, ERTO, EIDI, EOPI, and FEV3 are transmitted through respective AND-gates 240, 241, 242, 247, and 249 into the B register of the central processor, where such states are examined by the microprogram through comparison with appropriate masks.

Upon then recognizing that the error of which the central processor was notified by signal MCK is represented by flip-flop ERCE and that such error is, therefore, an interface, or external error, such microprogram then performs the following functions:

a. transferring all of flip-flops ERCE, ERTO, EIDI, EOPI, and FEV3 to the 0-state by microcommand TC5;

b. decoupling the channel in which such error occurred by transferring the corresponding signal OPO to the 0-state, thereby denoting that such channel is not operational;

c. transferring signal MCE to the 1-state to once again enable the functioning of the I/O control unit; and d. providing to the computer program information descriptive of the error which occurred.

Following the execution of these latter functions, the supervisory program of the computer system determines what actions next must be taken according to the type of error detected. For example, if the error was an external error, which may be caused by electrical noise, the supervisory program may elect to attempt the same information transfer operation once again. If this attempt also fails, the supervisory program next may initiate functional tests in order to determine with more precision the cause of the failure, or signal for the intervention of the operator.

On the other hand, if the parity error is detected during the transfer of data from a peripheral unit to the central processor, AND-gate 240A is disabled because signal $\overline{DTP}$ is now in the 0-state (signifying a data transfer operation), FIG. 13. Therefore, the central processor does not immediately receive notification of the occurrence and detection of such error. Accordingly, although the data then present in the DATA IN register is faulty, it nevertheless is transferred to the central processor. Such transfer is permitted because the reception of faulty data during a data transfer operation will not impair the execution of succeeding operations nor damage other information such as that already stored in main memory 2.

At the end of the data transfer operation in which the parity error was detected, but before the central processor generates micrcommand TC8 to transfer flip-flop FDTP to the 0-state, the states of flip-flops ERCE, ERTO, EIDI, EOPI, and FEV3 are examined by the generation of micrcommand TC6 to transfer such states to the central processor. Subsequently, microcommand TC5 is generated to transfer these five flip-flops to the 0-state. At the end of the operation in which the states of such flip-flops are examined, microcommand TC8 is generated to transfer flip-flop FDTP to the 0-state.

The parity bit in information to be transferred over the Data Bus from main memory 2 to a peripheral unit is checked immediately following the retrieval of such information from the read/write store of main memory 2 for transfer to the Data Bus. Such parity check is performed by parity control ntwork 120A when the retrieved information is delivered by the DATA register, FIG. 4. If network 120A detects a parity error in information held in the DATA register, it generates a signal ERR MM to provide notification of such parity error. Signal ERR MM is passed by AND-gate 233, FIG. 13, upon the occurrence of microcommand TC9, and transfers flip-flop ERCE to the 1-state. Microcommand TC9 is generated when information is to be transferred from main memory 2 to a peripheral unit.

Because a transfer of information from main memory 2 to a peripheral unit normally occurs only during a data transfer operation, wherein signal $\overline{DTP}$ is in the 0-state, AND-gate 240A is disabled, and the central processor does not immediately receive notification of the occurrence and detection of such error. In fact, the occurrence of such error is not determined by the central processor until after the end of the data transfer operation in which the error occurred in the manner described above with respect to parity errors occurring in data being received from a peripheral unit. Accordingly, if data which is being transferred from main memory 2 to a peripheral unit is faulty, the detection of such error does not affect the execution of the data transfer operation, which is carried to completion.

ERTO CIRCUIT

Flip-flop ERTO provides notification of a time-out error; i.e., a notification that a dialogue sequence has failed to be completed within a predetermined interval. When flip-flop ERTO is in the 1-state, representing the occurrence of a time-out error, the 1-output signal of flip-flop ERTO, then representing such error, is transmitted directly and unconditionally to line 243 and then through normally enabled AND-gate 250 to the central processor as signal MCK.

A time-out error is an interface error which may seriously jeopardize the operation of the computer system. For example, if an interface dialogue sequence is not completed within the predetermined interval, the possibility exists that it will not be completed at all. If a dialogue sequence does not go to completion, the computer system will remain perpetually awaiting the end of the sequence in order to proceed to initiate other operations. Accordingly, the central processor is always immediately notified of the occurrence of a time-out error, represented by the transfer of flip-flop ERTO to the 1-state.

EIDI CIRCUIT

Flip-flop EIDI provides notification of the occurrence of a dialogue inversion; i.e., a notification that a dialogue inversion has occurred as a consequence of the detection by the device adapter of a parity error or logical error. Following the transfer of flip-flop EIDI to the 1-state to represent the occurrence of a dialogue inversion, the subsequent operation of the system differs according to whether or not signal EV3 is present, such signal when present denoting that device adapter 20 has detected a parity error in control information.

A dialogue inversion unaccompanied by signal EV3 provides notification that the device adapter has detected information which, though correct with respect to parity, is improper for some other reason. For example, a command is improper if the binary code thereof is not recognized as being among the different codes allowable for commands. On the other hand, control information which may represent an address is improper if the address represented is not among the allowable addresses permitted such control information. In both such examples, the improper command code and address provided by the information are considered "illegal." On the other hand, if the information is data, rather than command or control information, the device adapter is more limited in being able to perform logical checks on the information, although with certain types of information the device adapter may determine whether the information is provided with a required "zone."

Thus, a dialogue inversion unaccompanied by signal EV3 provides notification of the detection of a logical error in information received. Such logical error may be attributable to a program error or to a malfunction in the internal operation of the central processor. However, such an error is not attributable to a malfunction of the interface, because the information received by the device adapted is correct with respect to parity.

On the other hand, a dialogue inversion accompanied by signal EV3 provides notification that the device adapter has detected a parity error in information received from the central processor. Such an error is attributable to either a malfunction in the interface or from electrical disturbance.

If the dialogue inversion occurs during a transfer of command or control information to the device adapter, the signal $\overline{DTP}$ enables AND-gate 236 and, provided such gate is enabled by signal PSEL, the 1-output signal of flip-flop EIDI, which represents such inversion, is passed through AND-gate 236 to lead 243. AND-gate 250, enabled by the normally present signal MCE, passes such error signal to the central processor as signal MCK. In response to the signal MCK appropriate circuits, not shown, perform certain functions and the operation proceeds, as described previously with respect to the ERCE circuit. Accordingly, the nature of the error is determined and appropriate actions are taken by the computer system.

On the other hand, if the dialogue inversion occurs during a data transfer operation, the signal $\overline{DTP}$ is in the 0-state, so that the central processor does not immediately receive notification of the occurrence of the dialogue inversion. In this instance, the state of flip-flop EIDI is represented on a lead 251 which is connected to the 1-output lead of the flip-flop, and the signal on lead 251 may be tested by the central processor at the end of an operation and before it starts to interpret a new program instruction. Thus, in a computer system capable of simultaneously executing several processes (multiprogramming), immediately upon the termination of one operation of a process, the interpretation phase of the following instruction of the same process examines the condition which occurred during the execution of concurrent operations and, therefore, recognizes the possible occurrence of an error in such processes. However, in the instance of the computer system capable of executing only one process at a time, the possibility of the occurrence of an error will be determined at the end of the data transfer operation, as described above, by examining the contents of flip-flops ERCE, ERTO, EIDI, EOPI, and FEV3.

EOPI CIRCUIT

Flip-flop EOPI provides notification that device adapter 20 or a peripheral unit coupled to such device adapter is not operational. The detection of such a malfunction by flip-flop EOPI and the subsequent notification of the central processor, according to whether or not command or control information of data is being transferred, occurs as described above with respect to the ERCE circuit.

INTERFACE CIRCUITS IN DEVICE ADAPTER

Figure 14:
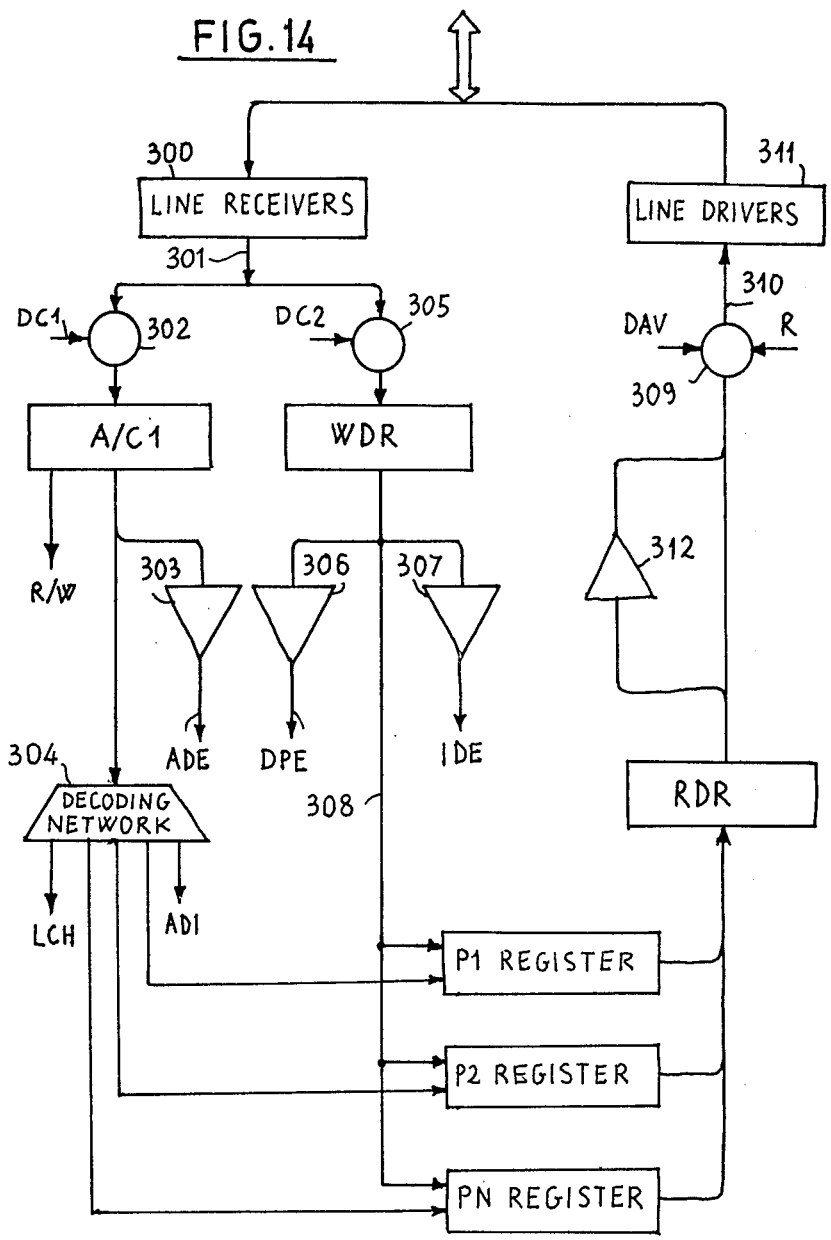
FIGS. 14–16 are logical block diagrams of a preferred form of the portion of the integrated interface of the instant invention embodied in a device adapter for peripherals.
Figure 15:
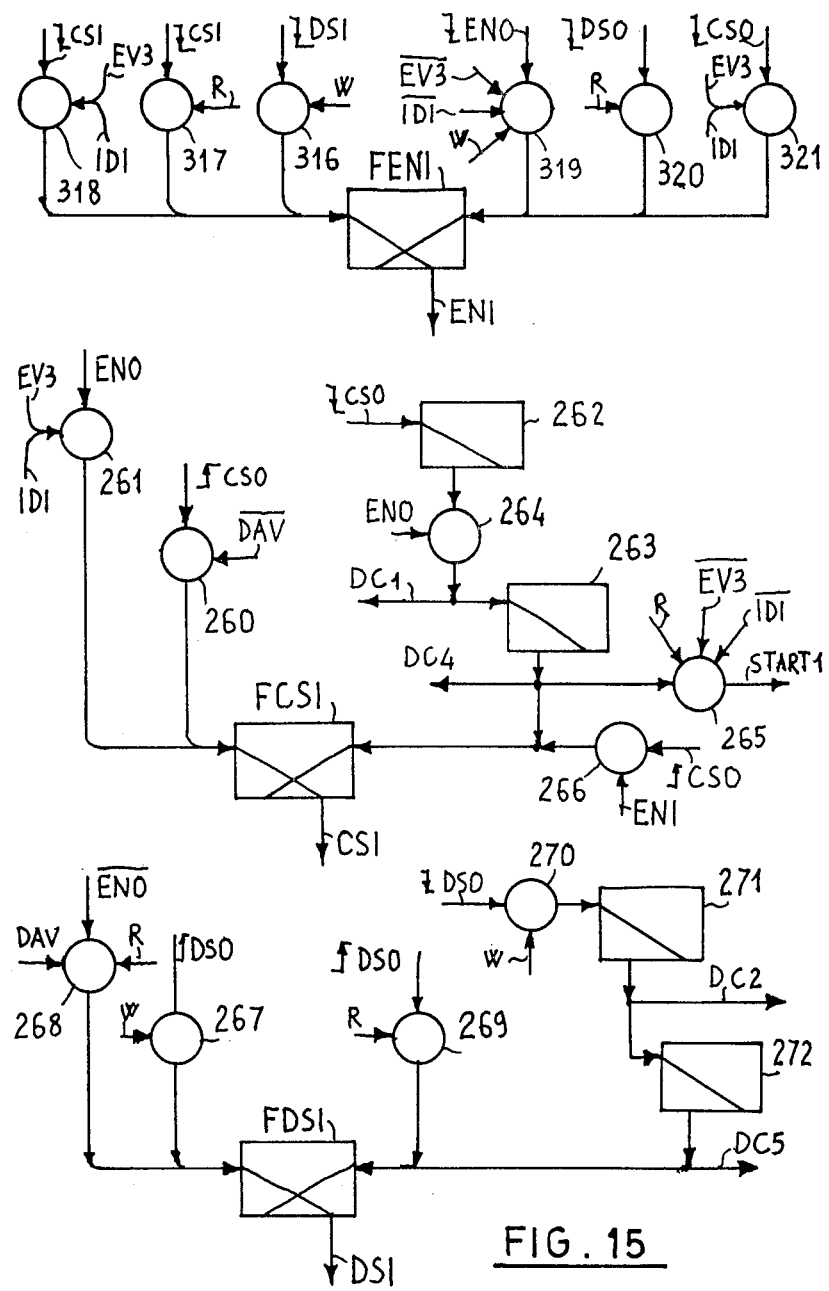
Figure 16:
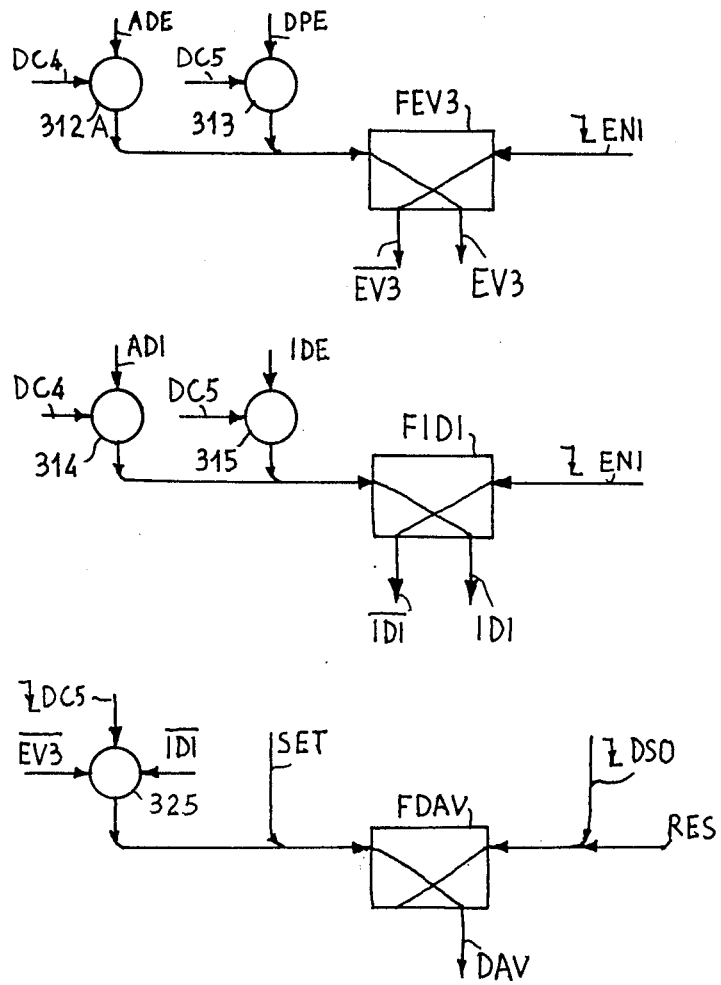

Circuits specifically dedicated to supervising the transfer of information over channel 17 which are provided in device adapter 20 are illustrated in the logical block diagrams of FIGS. 14–16.

Circuits for holding information transferred between the central processor and the device adapter over the Data Bus are illustrated in FIG. 14. Such circuits basically comprise an A/Cl register for storing a control character received from the Data Bus, a WDR register for storing another information character received from the Data Bus, and an RDR register for storing an information character to be applied to the Data Bus for transfer to the central processor.

Line receivers 300 are coupled to receive information characters transmitted over the Data Bus and to transfer such characters to a channel 301. AND-gate set 302 is coupled to receive information characters from channel 301 and to transfer such characters to the A/Cl register upon receipt of a command DC1, applied to one input lead of AND-gate set 302. The time of occurrence of command DC1 provides that the character transferred to the A/Cl register is a control character.

A parity check network 303 is coupled to receive signals representing the contents of the A/Cl register and to generate an output signal ADE when network 303 detects a parity error in the control character represented by such signals. Accordingly, signal ADE represents the detection by the device adapter of a parity error in a control character received from the central processor.

The control character held in the A/Cl register is applied to a decoding network 304, which decodes the control character. The decoded signals corresponding to the control character that are delivered by network 304 include signals P1, P2 . . . PN, for selecting corresponding peripheral unit registers; a signal LCH denoting, when appropriate, that the last character of a data transfer operation is being transmitted; and, as appropriate, a signal ADI providing notification that an illegally coded control character is present in the A/Cl register.

The lowest order bit of the control character in the A/Cl registr, bit 00, represents the direction of transfer for the information transfer operation to follow. A signal R or a signal W, depending on such bit 00, is delivered by the A/Cl register. Signal R denotes a read operation, in which information will be transferred from a peripheral unit over the Data Bus. Signal W denotes a write operation, in which information will be transferred over the Data Bus to a peripheral unit.

An AND-gate set 305 is coupled to receive information characters from channel 301 and to transfer such characters to the WDR register upon receipt of a command DC2, applied to one input lead of AND-gate set 305. The time of occurrence of command DC2 provides that the character transferred to the WDR register is an information character which is not a control character.

A parity check network 306 is coupled to receive signals representing the contents of the WDR register and to generate an output signal DPE when network 306 detects a parity error in the information character represented by such signals. Accordingly, signal DPE represents the detection by the device adapter of a parity error in an information character, other than a control character, received from the central processor.

A decoding network 307 is coupled to receive signals representing the contents of the WDR register, to decode the information character represented by such signals, and to generate an output signal IDE when network 307 detects an illegally coded information character in the WDR register. Accordingly, signal IDE represents the detection by the device adapter of an illegal code in an information character received from the central processor.

The information character in the WDR register is transferred over a channel 308 to the particular one of the registers selected by the output signals delivered by decoding network 304.

An information character to be transmitted to the central processor is retrieved from the register selected by the control character in the A/Cl register and is loaded into the RDR register. An AND-gate set 309 is coupled to receive the information character in the RDR register and to transfer such character over a channel 310 and through line drivers 311 to the Data Bus when AND-gate set 309 is enabled by signal R and DAV.

A parity bit generation network 312 is coupled to receive signals representing the information character in the RDR register and to respond to such signals to deliver an output signal representing the parity bit for such character. The output signal of network 312 is also transferred through AND-gate set 309, over channel 310, and through a line driver 311 to the Data Bus as the parity bit of the information character being transmitted.

Accordingly, the receipt of information from the Data Bus and the transfer of information thereto by the device adapter are controlled by commands which are generated by timing circuits described hereinafter.

Circuits for generating the timing signals ENI, CSI, and DSI, which are transmitted over the interface to the central processor are illustrated in FIG. 15. Such circuits basically comprise flip-flops FENI, FCSI, and FDSI.

The signal ENI is generated by circuits which comprise flip-flop FENI. The output leads of AND-gates 316, 317, and 318 are coupled to the 1-input lead of flip-flop FENI and the output leads of AND-gates 319, 320, and 321 are coupled to the 0-input lead of flip-flop FENI.

Flip-flop FENI is transferred to the 1-state by the trailing edge of the signal DSI, applied to one input lead of AND-gate 316, when the signal W, applied to the other input lead of AND-gate 316, is present to enable such gate. Flip-flop FENI is also transferred to the 1-state by the trailing edge of the signal CSI, applied to one input lead of AND-gate 317, when the signal R, applied to the other input lead of AND-gate 317 is present to enable such gate. Such transfer of flip-flop FENI to the 1-state by the trailing edge of signal DSI or signal CSI occurs during normal operation of the interface. However, when errors have been detected by the device adapter, flip-flop FENI is also transferred to the 1-state by the trailing edge of signal CSI, applied to one input lead of AND-gate 318, when either signal EV3, representing a parity error, or signal IDI, representing a logical error, applied to the other input lead of AND-gate 318, is present to enable such gate, regardless of the direction of transfer of information over the interface.

Flip-flop FENI is transferred to the 0-state by the trailing edge of signal ENO, applied to one input lead of AND-gate 319, when the signals W, $\overline{EV3}$, and $\overline{IDI}$, applied to the other input leads and AND-gate 319, are present to enable such gate. Such transfer of flip-flop FENI to the 0-state by the trailing edge of signal ENO occurs during write operations wherein no errors are detected. Flip-flop FENI is also transferred to the 0-state by the trailing edge of signal DSO, applied to one input lead of AND-gate 320, when signal R, applied to the other input lead of AND-gate 320, is present to enable such gate. Such transfer of flip-flop FENI to the 0-state by the trailing edge of signal ENO or DSO occurs during normal operation of the interface. However, where interface operation takes place after errors have been detected by the device adapter, flip-flop FENI is transferred to the 0-state by the trailing edge of signal CSO, applied to one input lead of AND-gate 321, when either signal EV3 or signal IDI, applied to the other input lead of AND-gate 321, is present to enable such gate.

The signal CSI is generated by circuits which comprise flip-flop FCSI. The output leads of AND-gates 260 and 261 are coupled to the 1-input lead of flip-flop FCSI and the output leads of a one-shot 263 and an AND-gate 266 are coupled to the 0-input lead of flip-flop FCSI.

Flip-flop FCSI is transferred to the 1-state by the leading edge of signal CSO, applied to one input lead of AND-gate 260, when signal $\overline{DAV}$, applied to the other input lead of AND-gate 260, is present to enable such gate. Signal $\overline{DAV}$, described in more detail hereinafter, denotes that the WDR and RDR registers are effectively empty. Flip-flop FCSI is also transferred to the 1-state by the signal ENO, applied to one input lead of AND-gate 261, when signal EV3 or signal IDI, applied to the other input lead of AND-gate 261, is present to enable such gate. Accordingly, the occurrence of an error signal EV3 or IDI when signal ENO is present causes flip-flop FCSI to transfer to the 1-state.

The trigger input lead of a one-shot 262 is coupled to receive the signal CSO. Accordingly, one-shot 262 is triggered by the trailing edge of signal CSO. The output lead of one-shot 262 is connected to one input lead of an AND-gate 264. The output lead of AND-gate 264 is coupled to the trigger input lead of one-shot 263. Accordingly, at the termination of the output signal of one-shot 262, which occurs at a predetermined time after one-shot 262 is triggered by the trailing edge of signal CSO, AND-gate 264 delivers an output signal to trigger one-shot 263, provided that AND-gate 264 is enabled by signal ENO. The termination of the output signal delivered by one-shot 263, which occurs at a predetermined time after one-shot 263 is triggered, transfers flip-flop FCSI to the 0-state.

The signal, or pulse, delivered by AND-gate 264 is designated as command DC1 and is also employed for timing the loading of the A/Cl register through AND-gate 302, FIG. 14. The pulse delivered by one-shot 263 is designated as command DC4 and is also applied to one input lead of an AND-gate 265. Accordingly, AND-gate 265 delivers an output signal, designated as signal START 1, upon the occurrence of command DC4, provided that signals R, $\overline{EV3}$, and $\overline{IDI}$, applied to the other input leads of AND-gate 265, are present to enable such gate.

Signal START 1 is employed by the associated peripheral units for controlling and initiating certain operations. The peripheral unit responds to the signal START 1 to transfer information from the register selected by the control character held in the A/Cl register, FIG. 14, into the RDR register. The peripheral unit then generates a command SET to transfer flip-flop FDAV, FIG. 16, to the 1-state to denote that information is available in the RDR register of the interface for transfer over the Data Bus to the central processor. The output signal DAV delivered by flip-flop FDAV thereupon enables AND-gate set 309 to transfer the information loaded into the RDR register to the Data Bus, FIG. 14.

The command DC4 is also employed for controlling the time of transfer of certain flip-flops to the 1-state, FIG. 16.

Flip-flop FCSI is also transferred to the 0-state by the leading edge of signal CSO, applied to one input lead of AND-gate 266, when the signal ENI, applied to the other input lead of AND-gate 266 is present to enable such gate. Such transfer of flip-flop FCSI to the 0-state by the leading edge of signal CSO occurs during a dialogue inversion caused by an error.

Accordingly, one-shots 262 and 263 provide a clocking sequence, by the pulses representing commands DC1 and DC4, for sequentially controlling the operations of (a) loading a control character into the A/Cl register, (b) checking the correctness of such control character, and (c) initiating, as required, the transfer of information from a peripheral unit to the central processor.

The signal DSI is generated by circuits which comprise flip-flop FDSI. The output leads of AND-gates 267 and 268 are coupled to the 1-input lead of flip-flop FDSI and the output leads of an AND-gate 269 and a one-shot 272 are coupled to the 0-input lead of flip-flop FDSI.

Flip-flop FDSI is transferred to the 1-state by the leading edge of signal DSO, applied to one input lead of AND-gate 267, when the signal W, applied to the other input lead of AND-gate 267, is present to enable such gate. Accordingly, during a write operation, the leading edge of signal DSO transfers flip-flop FDSI to the 1-state. Flip-flop FDSI is also transferred to the 1-state by the signal $\overline{ENO}$, applied to one input lead of AND-gate 268, when the signals R and DAV, applied to the other input leads of AND-gate 268, are present to enable such gate. Accordingly, when the interface has been prepared for transferring information from device adapter 20 to the central processor, denoted by the signal $\overline{ENC}$, a read operation is directed by the control character, and an information character is available in the RDR register, denoted by signal DAV, flip-flop FDSI is transferred to the 1-state to notify interface module 23 that a byte has been placed on the Data Bus.

Flip-flop FDSI is transferred to the 0-state by the leading edge of signal DSO, applied to one input lead of AND-gate 269, when a signal R, applied to the other input lead of AND-gate 269, is present to enable such gate. Accordingly, during a read operation, the leading edge of signal DSO transfers flip-flop FDSI to the 0-state.

The trigger input lead of a one-shot 271 is connected to the output lead of an AND-gate 270. Accordingly, one-shot 271 is triggered by the trailing edge of signal DSO, applied to one input lead of AND-gate 270, when signal W, applied to the other input lead of AND-gate 270, is present to enable such gate. Thus, one-shot 271 is triggered by the trailing edge of signal DSO during a write operation. The output lead of one-shot 271 is connected to the trigger input lead of one-shot 272. Accordingly, at the termination of the output signal of one-shot 271, which occurs at a predetermined time after one-shot 271 is triggered by the trailing edge of signal DSO, one-shot 272 is triggered. The termination of the output signal delivered by one-shot 272, which occurs at a predetermined time after one-shot 272 is triggered, transfers flip-flop FDSI to the 0-state. Accordingly, flip-flop FDSI is transferred to the 0-state at a predetermined time after signal DSO is transferred to the 0-state, during a write operation.

The signal, or pulse, delivered by one-shot 271 is designated as command DC2 and is also employed for timing the loading of the WDR register through AND-gate set 305, FIG. 14. The pulse delivered by one-shot 272 is designated as command DC5 and is also employed for controlling the time of transfer of certain flip-flops to the 1-state, FIG. 16.

Circuits for generating device adapter control signals EV3, IDI, and DAV are illustrated in FIG. 16. Such circuits basically comprise flip-flops FEV3, FIDI, and FDAV.

The signal EV3 is generated by circuits which comprise flip-flop FEV3. The output leads of AND-gates 312A and 313 are coupled to the 1-input lead of flip-flop FEV3.

Flip-flop FEV3 is transferred to the 1-state by the signal ADE, applied to one input lead of AND-gate 312A, when the command DC4, applied to the other input lead of AND-gate 312A, is present to enable such gate. Accordingly, flip-flop REV3 is transferred to the 1-state upon the detection of a parity error in the control character in the A/Cl register. Flip-flop FEV3 is also transferred to the 1-state by signal DPE, applied to one input lead of AND-gate 313, when the command DC5, applied to the other input lead of AND-gate 313, is present to enable such gate. Accordingly, flip-flop FEV3 is transferred to the 1-state upon the detection of a parity error in the information character in the WDR register. Therefore, the 1-state of flip-flop FEV3 represents the detection of a parity error in an information character received by the device adapter from the Data Bus.

Flip-flop FEV3 is transferred to the 0-state by the trailing edge of signal ENI, applied directly to the 0-input lead of flip-flop FEV3, and occurring at the conclusion of a dialogue sequence.

The signal IDI is generated by circuits which comprise flip-flop FIDI. The output leads of AND-gates 314 and 315 are coupled to the 1-input lead of flip-flop FIDI.

Flip-flop FIDI is transferred to the 1-state by the signal ADI, applied to one input lead of AND-gate 314, when command DC4, applied to the other input lead of AND-gate 314, is present to enable such gate. Accordingly, flip-flop FIDI is transferred to the 1-state upon the detection of an illegally coded control character in the A/Cl register. Flip-flop FIDI is also transferred to the 1-state by signal IDE, applied to one input lead of AND-gate 315, when command DC5, applied to the other input lead of AND-gate 315, is present to enable such gate. Accordingly, flip-flop FIDI is transferred to the 1-state when an illegally coded information character is present in the WDR register, denoted by signal IDE. Therefore, the 1-state, of flip-flop FIDI represents the detection of an illegally coded information character received by the device adapter from the Data Bus; i.e., a character having a logical error.

Signal IDI, generated by the 1-state of flip-flop FIDI, triggers the exchange of signals CSI and CSO during a dialogue inversion. In addition, signal IDI may be employed for performing other functions within the device adapter, such as initiating the transmission of signal EV2, and other signals.

Flip-flop FIDI is transferred to the 0-state by the trailing edge of signal ENI, applied directly to the 0-input lead of flip-flop FIDI and occurring at the conclusion of a dialogue sequence.

The signal DAV is generated by circuits which comprise flip-flop FDAV. The output lead of an AND-gate 325 is coupled to the 1-input lead of flip-flop FDAV.

Flip-flop FDAV is transferred to the 1-state by the trailing edge of the command DC5 pulse, applied to one input lead of AND-gate 325, when signals $\overline{EV3}$ and $\overline{IDI}$, applied to the other input leads of AND-gate 325, are present to enable such gate. Accordingly, flip-flop FDAV is transferred to the 1-state during a write data operation and after the WDR register has been loaded, as denoted by command DC5, provided that the received data character is correct, as denoted by signals $\overline{EV3}$ and $\overline{IDI}$.

When the data present in the WDR register has been effectively accepted by the designated peripheral unit, such peripheral unit generates a signal RES, which is applied directly to the C-input lead of flip-flop FDAV to transfer the flip-flop to the 0-state.

Conversely, during a read data operation, the peripheral unit generates a signal SET after the requested information has been transferred from the selected one of registers P1 . . . PN into the RDR register. Flip-flop FDAV is thereupon transferred to the 1-state by the signal SET, applied directly to the 1-input lead of flip-flop FDAV. Such transfer of flip-flop FDAV to the 1-state by the signal SET denotes that a data character is available in the device adapter for transfer over the Data Bus. In this latter instance, flip-flop FDAV subsequently is transferred to the 0-state by the trailing edge of signal DSO, applied directly to the 0-input lead of flip-flop FDAV and occurring after the data transfer of the particular data character has been completed.

Therefore, the 1-state of flip-flop FDAV represents that a data character received over the interface, or to be transferred over the interface, is available in an interface register WDR or RDR of the device adapter.

The device adapter also contains other circuits, such as line receivers and line drivers, and circuits specifically dedicated to supervising the operation of the peripheral units associated with the device adapter, a description of which are not essential for an understanding of the instant invention.

SUMMARY OF ERROR-RELATED OPERATIONS

In accordance with the instant invention, the following error-related operations are particularly pertinent:

1. For both directions of information transfer over the interface channel, a parity bit is generated for such information immediately before the information enters the interface channel and the parity of such information is checked immediately after such information leaves the interface channel. Accordingly, any parity error detected in such information is representative of an interface malfunction or an electrical disturbance.

2. For information being transferred over the interface channel from central processor to device adapter, the logical correctness of such information is checked immediately after it leaves the interface channel. Accordingly, any logical error detected in such information is indicative of the creation of an error in such information prior to its entry onto the interface channel, such as by malfunction in the central processor or a programming error.

3. Two distinct means of error notification are provided; (a) the exchange of signals CSI and CSO, unaccompanied by signal EV3, for denoting logical errors and (b) the exchange of signals CSI and CSO, accompanied by signal EV3, for denoting parity errors.

4. The circuits for identifying error signals are arranged to suspend information transfer sequences whenever notification is provided of either a logical or parity error detected in a control character or in control or command information. However, when an error is detected in data being transferred, notification and recognition of the existence of the error is delayed until the conclusion of the data transfer.

While the principles of the invention have not been made clear in an illustrative embodiment, there will be immediately obvious to those skilled in the art many modifications in structure, arrangements, the elements and components used in the practice of the invention, and otherwise, which are particularly adapted for specific environments and operating requirements, without departing from those principles. The appended claims are therefore intended to cover any such modifications, within the limits only of the true spirit and scope of the invention.

I claim:

1. An integrated interface for providing communication between the central processor and peripheral units of a computer system, wherein the transfer of control information or of data information is preceded by the transmittal of control character information from the central processor, comprising:

a channel having a bidirectional bus for transferring information therethrough and having lines for transferring signals therethrough in a single direction, one end of said channel being coupled to said central processor and the other end of said channel being coupled to at least one of said peripheral units; and error identification means coupled to said channel for detecting errors in information and for distinguishing such errors as channel errors, which are errors due to transfer of information over said channel, and logical errors, which are errors in information applied to said channel, and for distinguishing whether or not such errors will adversely affect subsequent operations, said error identification means comprising:

a first network for generating parity bits for information immediately prior to said information entering the central processor end of said bus;

a first detector for sensing information leaving the peripheral unit end of said bus and responsive thereto for generating a first signal representing the detection of a parity error in control information, a second signal representing the detection of a parity error in data information, and a third signal representing the detection of a logical error in information;

a second network for generating parity bits for information immediately prior to said information entering the peripheral unit end of said bus;

a second detector for sensing information leaving the central processor end of said bus and responsive thereto for generating a fourth signal representing the detection of a parity error in said information;

a first circuit responsive to the signals generated by said first detector for initiating a signal exchange on said lines of said channel to represent the occurrence of an error in information received from the peripheral unit end of said bus;

a second circuit responsive to said first and second signals for generating a fifth signal representing the occurrence of a parity error in information received from the peripheral unit end of said bus;

a third circuit responsive to said fourth signal for generating signals respectively representing, in data information leaving the central processor end of said bus, the occurrence of a parity error in control information and a parity error in data information; and a fourth circuit responsive to said signal exchange and said fifth signal for generating signals respectively representing, in information leaving the peripheral unit end of said bus, i. the occurrence of a parity error in control information, ii. the occurrence of a parity error in data information, and iii. the occurrence of a logical error in control information.

2. The interface of claim 1, further comprising:

a first register for receiving control information leaving the peripheral unit end of said bus;

a second register for receiving data information leaving the peripheral unit end of said bus; and wherein said first detector comprises:

first sensing means coupled to said first register for detecting a parity error in the contents of said first register and for generating said first signal upon detection of a parity error, second sensing means coupled to said second register for detecting a parity error in the contents of said second register and for generating said second signal upon detection of a parity error, and third sensing means coupled to said second register for detecting a logical error in the contents of said second register and for generating said third signal upon detection of a logical error.

3. An interface for providing the transfer of control and data characters between a central processor and a peripheral unit, comprising:

a channel for transferring characters between first and second ends thereof, said first end being coupled to said central processor and said second end being coupled to said peripheral unit;

parity generation circuits for generating parity bits for each of said characters immediately prior to said character entering said channel;

parity check circuits for testing each of said characters immediately after said characters emerge from said channel and for generating first signals representing the detection of parity errors in said characters;

code check circuits for testing each of said characters immediately after said characters emerge from the second end of said channel and for generating second signals representing the detection of erroneous codes in said characters;

first notification means responsive to both said first and second signals for generating third signals for notifying said central processor of the occurrence of an error in characters emerging from the second end of said channel;

second notification means responsive to said first signals for generating a fourth signal for notifying said central processor of the occurrence of a parity error in characters emerging from the second end of said channel;

and a first circuit responsive to said third and fourth signals for providing immediate notification to the central processor of the occurrence of said third and fourth signals when the error represented by said third and fourth signals has been detected in a control character, but for delaying notification to the central processor of the occurrence of said third and fourth signals when the error represented by said third and fourth signals has been detected in a data character.

4. The interface of claim 3, further comprising:

a second circuit responsive to said first signals for generating a fifth signal for notifying said central processor of the occurrence of a parity error in characters emerging from the first end of said channel; and wherein said first circuit is further responsive to said fifth signal for providing immediate or delayed notification according to whether the error represented by said fifth signal has been detected respectively in a control character or in a data character.

* * * * *